US012791812B2

(12) United States Patent
Cams et al.

(10) Patent No.: US 12,791,812 B2
(45) Date of Patent: Nov. 10, 2026

(54) SEALING ARRANGEMENT FOR A CABLE ENTRANCE TO AN ENCLOSURE

(71) Applicant: CommScope Technologies LLC, Hickory, NC (US)

(72) Inventors: Eddy Luc Cams, Bilzen (BE); Iris Boons, Antwerp (BE); William B. Bryan, Fuquay-Varina, NC (US)

(73) Assignee: CommScope Technologies LLC, Claremont, NC (US)

( * ) Notice: Subject to any disclaimer, the term of this patent is extended or adjusted under 35 U.S.C. 154(b) by 394 days.

(21) Appl. No.: 18/696,411

(22) PCT Filed: Sep. 28, 2022

(86) PCT No.: PCT/US2022/077162

§ 371 (c)(1),
(2) Date: Mar. 28, 2024

(87) PCT Pub. No.: WO2023/056286

PCT Pub. Date: Apr. 6, 2023

(65) Prior Publication Data

US 2024/0385404 A1 Nov. 21, 2024

Related U.S. Application Data

(60) Provisional application No. 63/249,985, filed on Sep. 29, 2021.

(51) Int. Cl.
*G02B 6/44* (2006.01)

(52) U.S. Cl.
CPC ........ *G02B 6/44465* (2023.05); *G02B 6/4447* (2013.01)

(58) Field of Classification Search
CPC ............................ G02B 6/444; G02B 6/44465
See application file for complete search history.

(56) References Cited

U.S. PATENT DOCUMENTS

| | | | |
|---|---|---|---|
| 5,442,004 | A | 8/1995 | Sutherland et al. |
| 5,541,250 | A | 7/1996 | Hudson et al. |
| 5,618,882 | A | 4/1997 | Hammond et al. |
| 5,994,446 | A | 11/1999 | Graulus et al. |
| 8,642,891 | B2 | 2/2014 | Berghmans et al. |
| 8,774,586 | B2 | 7/2014 | Kim et al. |

(Continued)

FOREIGN PATENT DOCUMENTS

| | | | |
|---|---|---|---|
| KR | 10-1929586 | B1 | 3/2019 |
| WO | 88/00603 | A2 | 1/1988 |

(Continued)

OTHER PUBLICATIONS

Extended European Search Report for Application No. 22877523.5 mailed Jul. 16, 2025.

(Continued)

*Primary Examiner* — Eric Wong
(74) *Attorney, Agent, or Firm* — Merchant & Gould P.C.

(57) ABSTRACT

The present disclosure relates to cable sealing arrangements having features that facilitate cable insertion into the sealing arrangements. The present disclosure also relates to cable sealing arrangements adapted to accommodate cables of varying sizes and cable arrangements adapted to enhance effective sealing about cables.

19 Claims, 30 Drawing Sheets

(56) References Cited

U.S. PATENT DOCUMENTS

| | | | | |
|---|---|---|---|---|
| 11,002,929 | B2 * | 5/2021 | Geens .................. | G02B 6/4444 |
| 2011/0080078 | A1 * | 4/2011 | Perschon ................. | H02B 1/50<br>248/68.1 |
| 2017/0033544 | A1 | 2/2017 | Coenegracht et al. | |
| 2018/0059348 | A1 | 3/2018 | Burkett et al. | |
| 2020/0106254 | A1 | 4/2020 | Doultremont et al. | |
| 2021/0011239 | A1 | 1/2021 | Geens et al. | |
| 2021/0255409 | A1 | 8/2021 | Geens et al. | |
| 2022/0382008 | A1 * | 12/2022 | Coenegracht ...... | G02B 6/44775 |

FOREIGN PATENT DOCUMENTS

| | | | |
|---|---|---|---|
| WO | 93/23472 | A1 | 11/1993 |
| WO | 94/18273 | A1 | 8/1994 |
| WO | 2014/005916 | A2 | 1/2014 |
| WO | 2017/167819 | A1 | 10/2017 |
| WO | 2018/048910 | A2 | 3/2018 |
| WO | 2019/160995 | A1 | 8/2019 |
| WO | 2019/173663 | A1 | 9/2019 |
| WO | 2021/096859 | A1 | 5/2021 |
| WO | 2021/113109 | A1 | 6/2021 |

OTHER PUBLICATIONS

International Search Report and Written Opinion for Application No. PCT/US2022/077162 mailed Jan. 25, 2023.

* cited by examiner

SEALING ARRANGEMENT FOR A CABLE ENTRANCE TO AN ENCLOSURE

CROSS-REFERENCE TO RELATED APPLICATION

This application is a National Stage Application of PCT/US2022/077162, filed on Sep. 28, 2022, which claims the benefit of U.S. Patent Application Ser. No. 63/249,985, filed on Sep. 29, 2021, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers. It is often preferred for the telecommunications enclosures to be re-enterable. The term "re-enterable" means that the telecommunications enclosures can be re-opened to allow access to the telecommunications components housed therein without requiring the removal and destruction of the telecommunications enclosures. For example, certain telecommunications enclosures can include separate access panels that can be opened to access the interiors of the enclosures and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, or other structures. Further enclosures include domes attached to bases via clamps. Telecommunications enclosures are typically sealed to inhibit the intrusion of moisture or other contaminants. Example cable sealing arrangements for enclosures are disclosed by PCT International Publication Numbers WO 2014/005916; WO 2017/167819; WO 2018/048910; WO 2019/160995; WO 2019/173663; and WO 2021/096859.

SUMMARY

The present disclosure relates to sealing arrangements for sealing locations where cables enter/exit enclosures. The sealing arrangements can include a volume of sealing gel including multiple gel sections that meet at cable pass-through interfaces. The volume of cable sealing gel can be contained between inner and outer axial containment barriers.

In one example, the volume of sealing gel has a length, a thickness and a height. The volume of sealing includes a first gel section, a second gel section and a third gel section which cooperate to define the height. The second gel section is positioned between the first and third gel sections. The volume of sealing gel defines a first cable pass-through interface between the first gel section and the second gel section and a second cable pass-through interface between the third gel section and the second gel section. Cables can be routed along an axial orientation through the thickness of the volume of sealing gel at the first and second cable pass-through interfaces.

In one example, the volume of sealing gel can be axially contained between inner and outer containment barriers that are capable of being canted with respect to one another in the height orientation during installation of cables in the volume of gel prior to installation of the cable sealing assembly in the enclosure. The canting action facilitates installing larger cables at one of the first and second cable pass-through interfaces by reducing the gel pressure during cable insertion at the interface where the larger cables are installed. When the cable sealing assembly is subsequently installed in the enclosure, the barriers mechanically interface with the enclosure to bring the barriers back into a parallel relationship thereby eliminating the cant and axially fixing the barriers with respect to each other. In certain examples, the inner and outer containment barriers can be coupled together by axial barrier couplers which may have different ranges of length extension (i.e., different levels of axial play) which can allow canting of the barriers prior to assembly of the sealing assembly in the enclosure.

In certain examples, the inner or outer containment barriers can include gel pressure/flow control ribs that project partially axially through the volume of sealing gel at locations in line with spaces between the barrier couplers. In certain examples, the pressure/flow ribs can have convex sides that face toward one of the first and second cable pass-through interfaces and concave sides that face toward the other of the first and second cable pass-through interfaces. The pressure/flow control ribs can be used to control flow of gel in the height orientation to assist in maintaining localized pressures at the first and second cable pass-through interfaces. Thus, while the first and second cable pass-through interfaces are defined in part by different portions of a contiguous volume of gel, the pressure/flow control ribs can allow, at least to a certain degree or at least partially, independent pressurization at each of the cable pass-through interfaces.

In certain examples, cable sealing arrangements in accordance with the principles of the present can include a cable pass-through interface including a gel section including a sealing rib having a reduced axial thickness as compared to a primary gel thickness of the sealing arrangement and also including inner and outer tapered cable receptables at inner and outer sides of the sealing ribs. The tapered receptacles can have closed minor ends at the sealing rib and open major ends away from the sealing rib. The tapered receptacles can have open sides that face toward an opposing gel section of the cable pass-through interface.

In certain examples, cable sealing arrangements in accordance with the principles of the present can include a cable pass-through interface including a gel section including cable pass-through locations including removeable gel containers that can be removed to reduce the volume of sealing gel at the cable pass-through interface to accommodate larger cables at cable pass-through locations of the cable pass-through interface. The gel containers can remain in the gel section to accommodate smaller cables at the cable pass-through locations. The removeable gel containers are overmolded within the gel section. The containment bodies define cavities which contain first removeable portions of the sealing gel. The first removeable portions of the sealing gel extend to open sides of the containment bodies. Second removeable portions of the sealing gel extend beyond the open sides of the containment bodies from the open sides to the cable pass-through interface when the gel containers are not removed from the gel section.

In certain examples, cable sealing arrangements in accordance with the principles of the present disclosure can include a cable pass-through interface including a gel section including a primary thickness portion and a reduced thickness portion. A sealing rib extends along a length of the gel section and defines the reduced thickness portion. Inner and outer face surfaces of the sealing rib are recessed relative to inner and outer face surfaces of the primary thickness portion such that the sealing rib is thinner than the primary thickness portion. The sealing rib is positioned at the cable sealing interface. The primary thickness portion defines curved slot structures that extend only partially through the primary thickness portion. The curved slot structures are configured to collapse to enhance gel conformance about cables when the cables are sealed at the cable pass-through interface. Each curved slot structure is arranged defining a concave curvature that faces toward the cable pass-through interface. Each curved slot structure includes first and second curved slot segments separated by a slot reinforcing rib.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular examples of the present disclosure and therefore do not limit the scope of the present disclosure. Examples of the present disclosure will hereinafter be described in conjunction with the appended drawings, wherein like numerals denote like elements.

DETAILED DESCRIPTION

Figure 1:
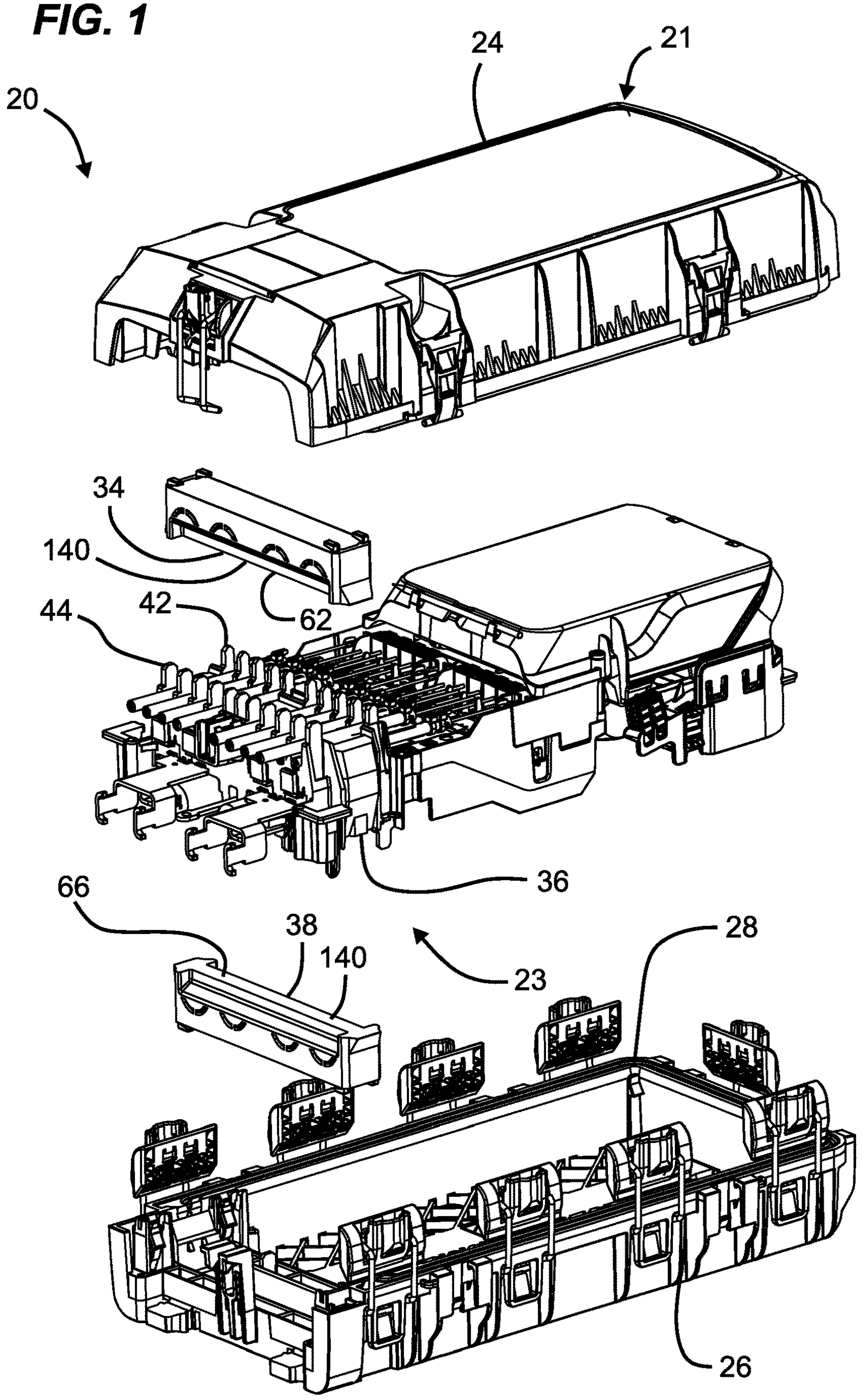
FIG. 1 is an exploded view of an enclosure in accordance with the principles of the present disclosure including a cable sealing arrangement in accordance with the principles of the present disclosure.

Various examples will be described in detail with reference to the drawings, wherein like reference numerals represent like parts and assemblies throughout the several views.

FIG. 1 depicts a telecommunication enclosure 20 having a sealing arrangement in accordance with the principles of the present disclosure. The telecommunication enclosure 20 is preferably a re-enterable enclosure. In one example, the enclosure includes a housing 21 having first and second housing pieces 24, 26 that define an interior for housing telecommunication components such as fiber optic splices, passive optical power splitters, wavelength division multiplexers, fiber optic adapters, fiber optic connectors, fiber management trays, cable loop storage locations, and other components. When the first and second housing pieces 24, 26 are mounted together (e.g., latched or clamped together), the interior of the enclosure 20 is preferably environmentally sealed. The sealing arrangement can include a perimeter seal 28 for providing sealing between the first and second housing pieces 24, 26 about the perimeter of the enclosure 20. The first and second housing pieces 24, 26 can be separated from one another to provide access to the interior of the enclosure 20. The sealing arrangement can also include a cable sealing arrangement 23 that is in contact/communication with the perimeter seal 28. In one example, the cable sealing arrangement 23 mounts between the housing pieces 24, 26 at one end of the housing 21. The cable sealing arrangement 23 includes a volume of cable sealing gel 29 (see FIGS. 22 and 23) that defines first and second cable pass-through interfaces 30, 32 through which cables can be routed into the enclosure 20 and sealed with respect to the housing 21. It will be appreciated that the cables define cable axes that define cable pass-through directions/orientation that extends through the cable sealing arrangement 23 at the cable pass-through interfaces 30, 32. The pass-through orientation can be referred to as an axial orientation since it extends along the cable axes.

Figure 18:
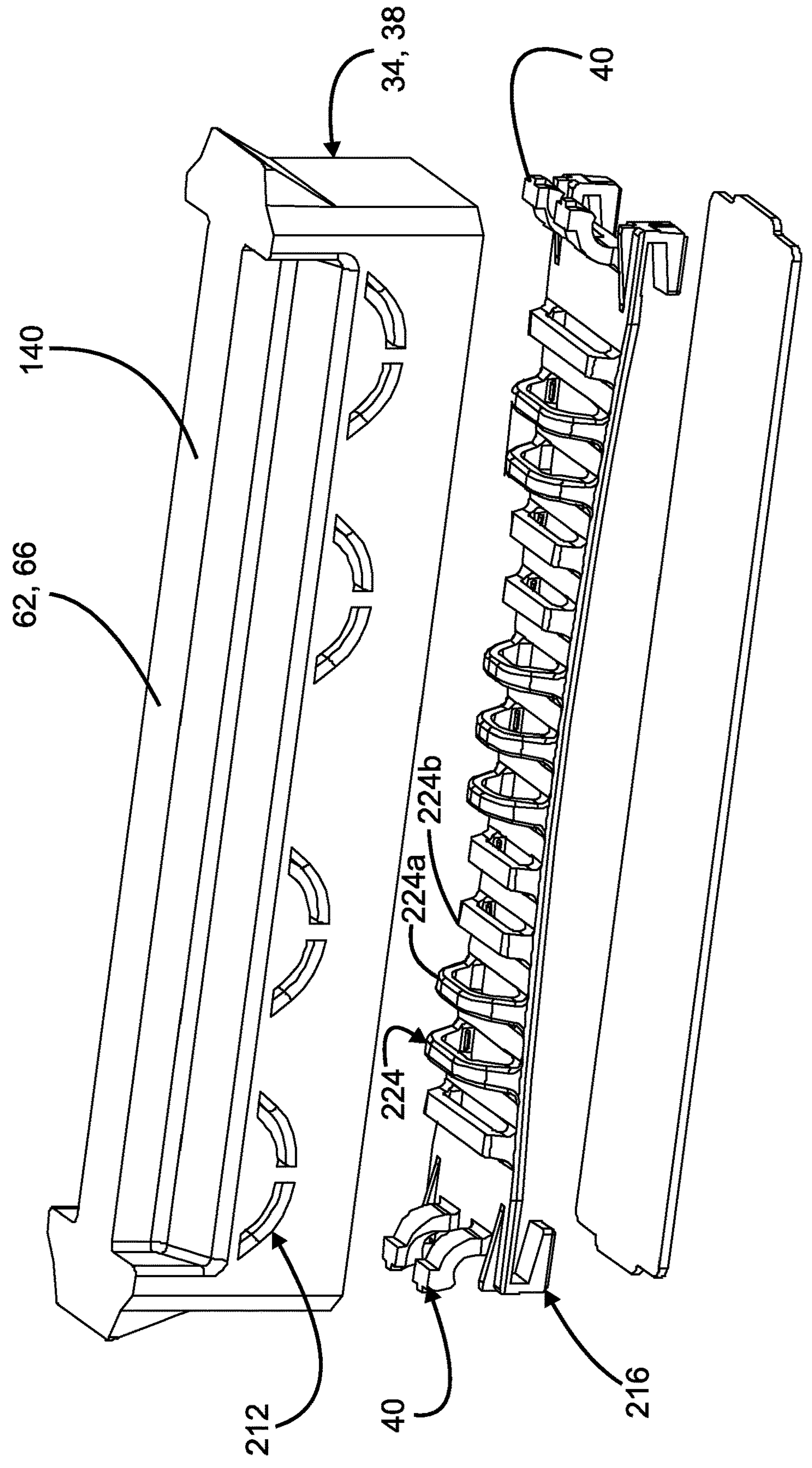
FIG. 18 is an exploded view of the gel section of FIGS. 14 and 15.
Figure 22:
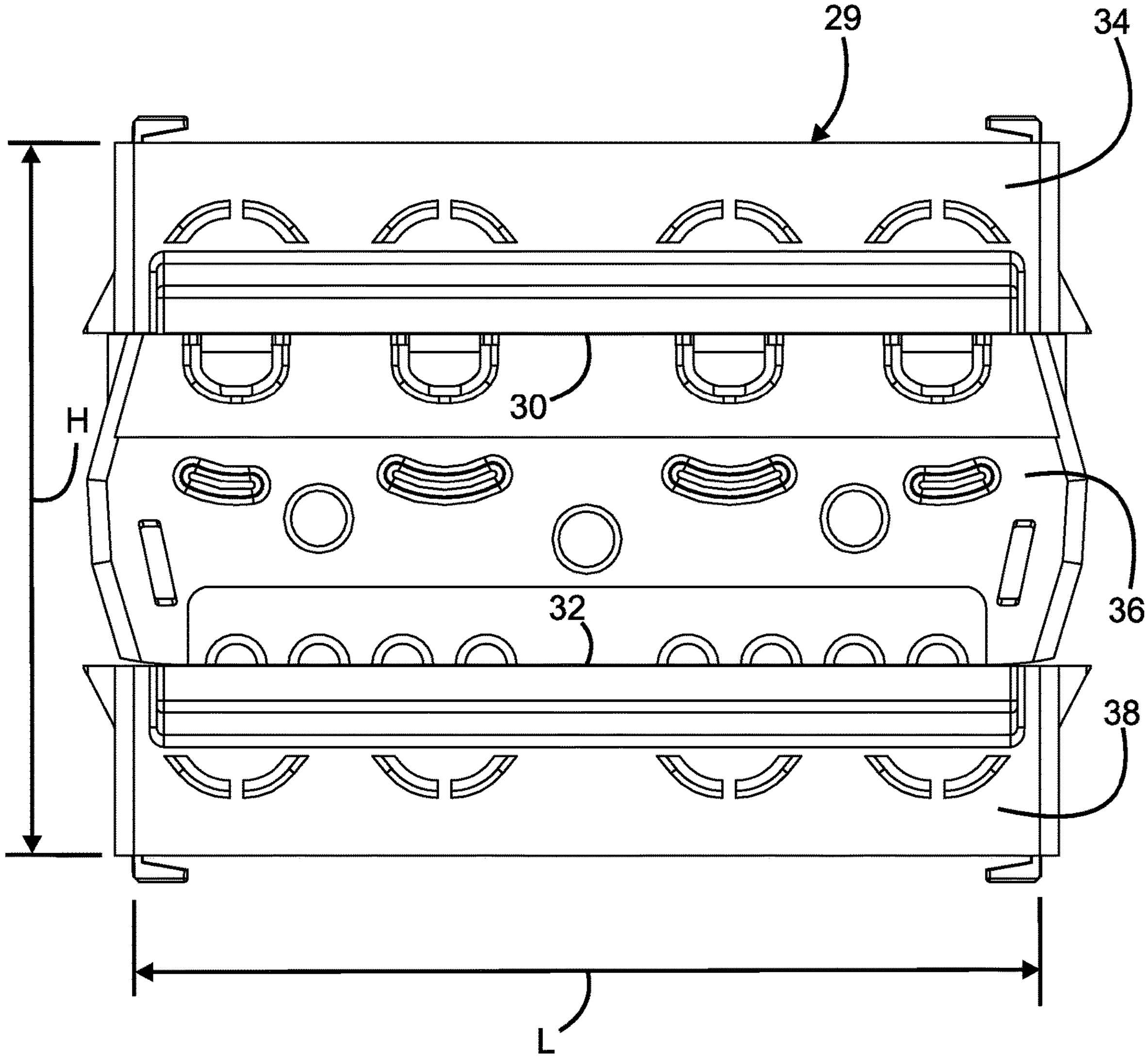
FIG. 22 is an outer view of the upper, middle and lower gel sections of the cable sealing arrangement of the enclosure of FIG. 1.
Figure 23:
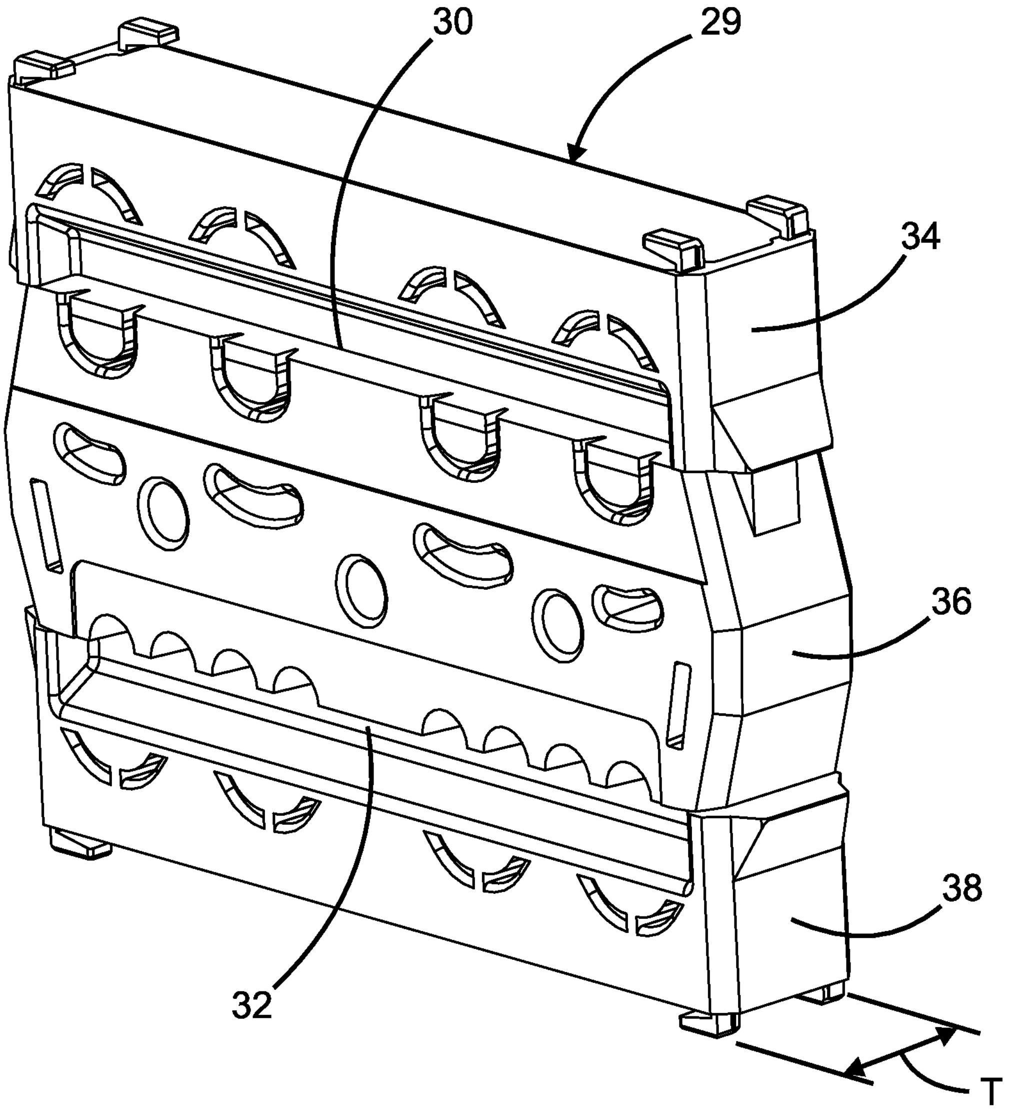
FIG. 23 is a perspective view of the upper, middle and lower gel sections of the cable sealing arrangement of the enclosure of FIG. 1.

Referring to FIGS. 22 and 23, the volume of sealing gel 29 has a length L, a thickness T, and a height H. The volume of sealing gel 29 includes an upper gel section 34, a middle gel section 36 and a lower gel section 38 which cooperate to define the height H. The middle gel section 36 is positioned between the upper and lower gel sections 34, 38. The first cable pass-through interface 30 is defined between the upper gel section 34 and the middle gel section 36. The second cable pass-through interface 32 is defined between the middle gel section 36 and the lower gel section 38. In the depicted example, the upper and lower gel sections 34, 38 have identical constructions, but in other examples the upper and lower gel sections may have different configurations. In the depicted example, the upper and lower gel sections 34, 38 include tabs 40 (see FIG. 18) for securing the upper and lower gel sections 34, 38 within the housing 21. For example, the upper gel section 34 can be secured (e.g., latched or snapped within) a receptacle (e.g., a pocket) within the first housing piece 24 and the lower gel section 38 can be secured within a receptacle defined by the second housing piece 26.

Figure 2:
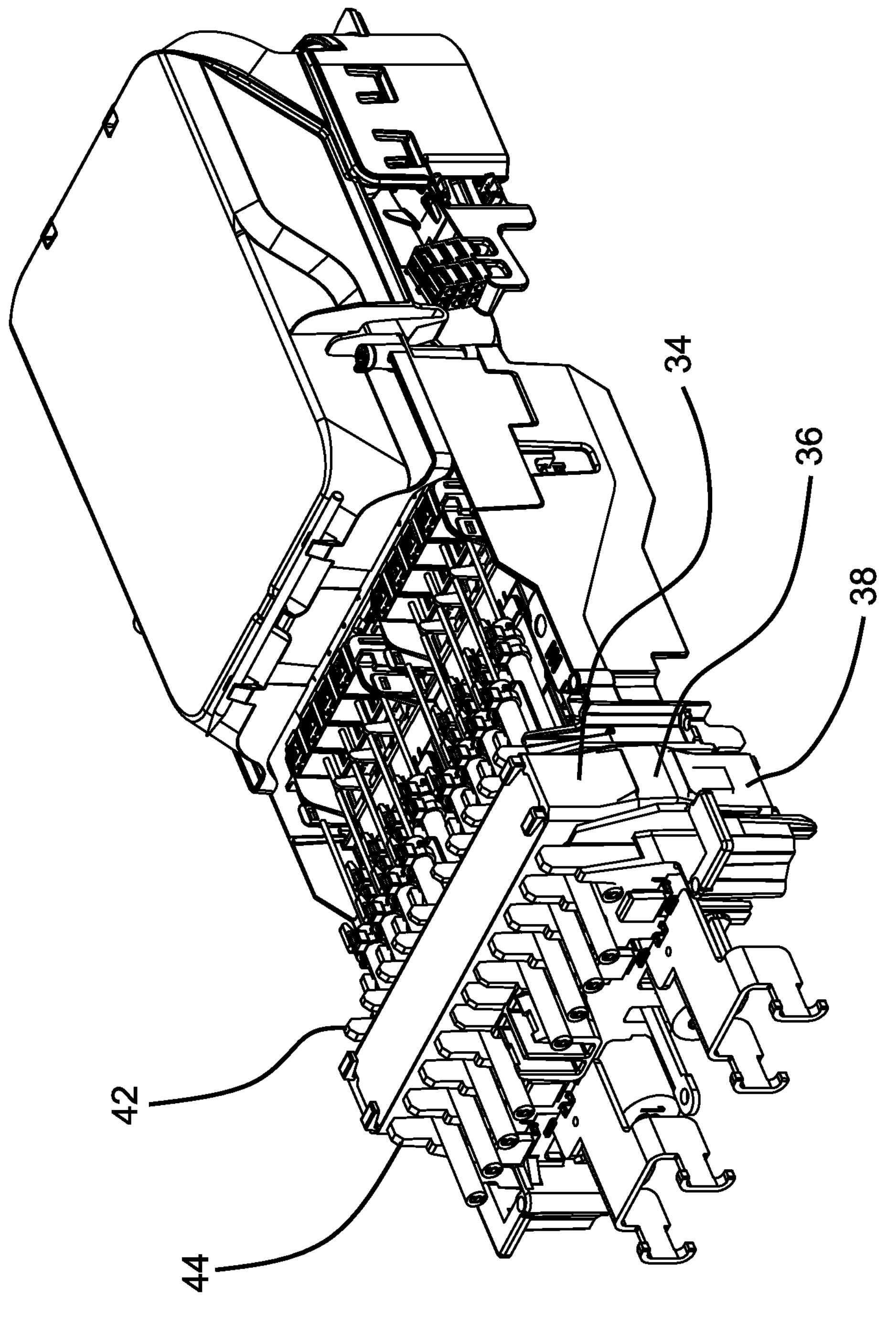
FIG. 2 is a perspective view of an insert of the enclosure of FIG. 1 including the cable sealing arrangement.
Figure 3:
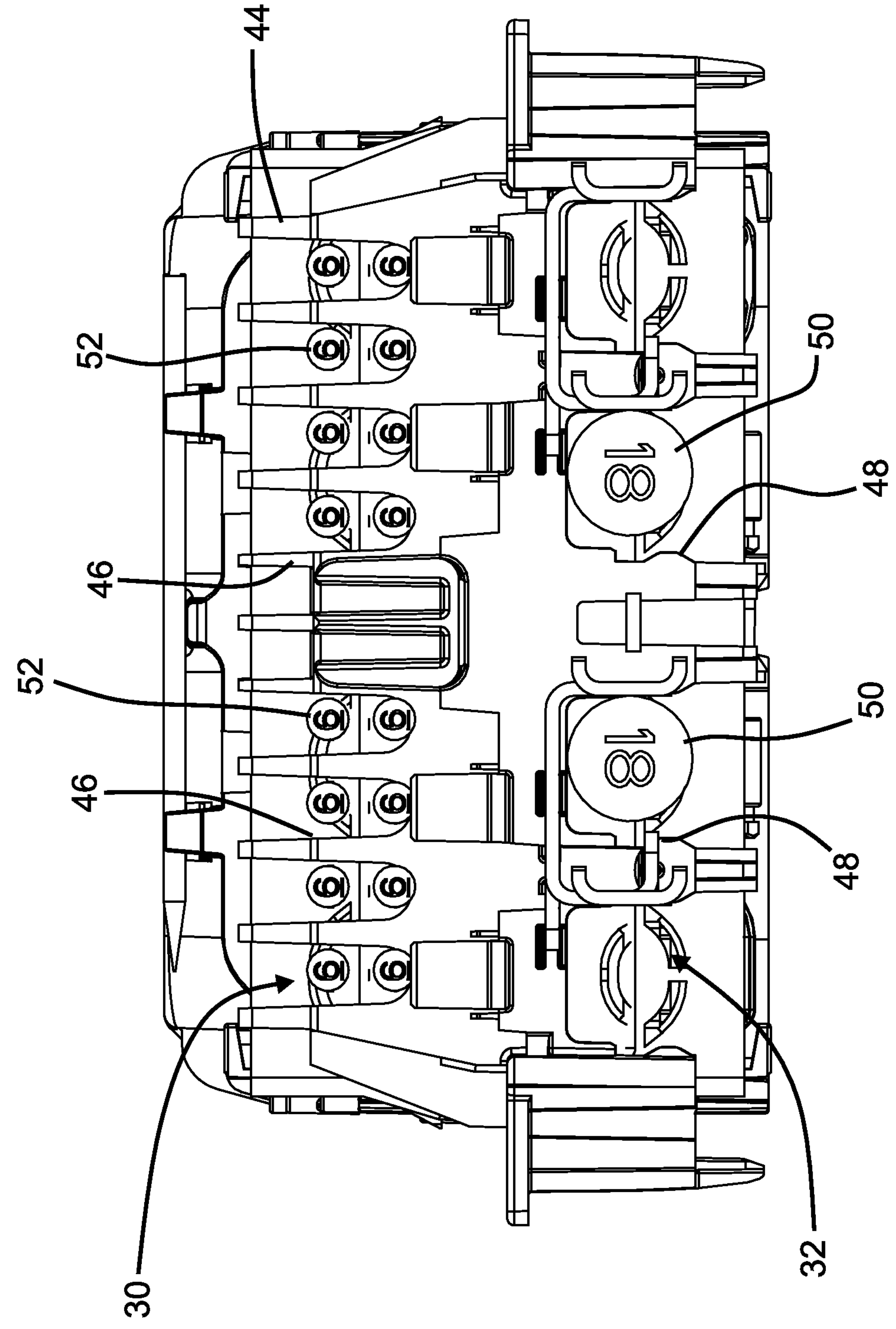
FIG. 3 is an end view of the enclosure of FIG. 1.
Figure 4:
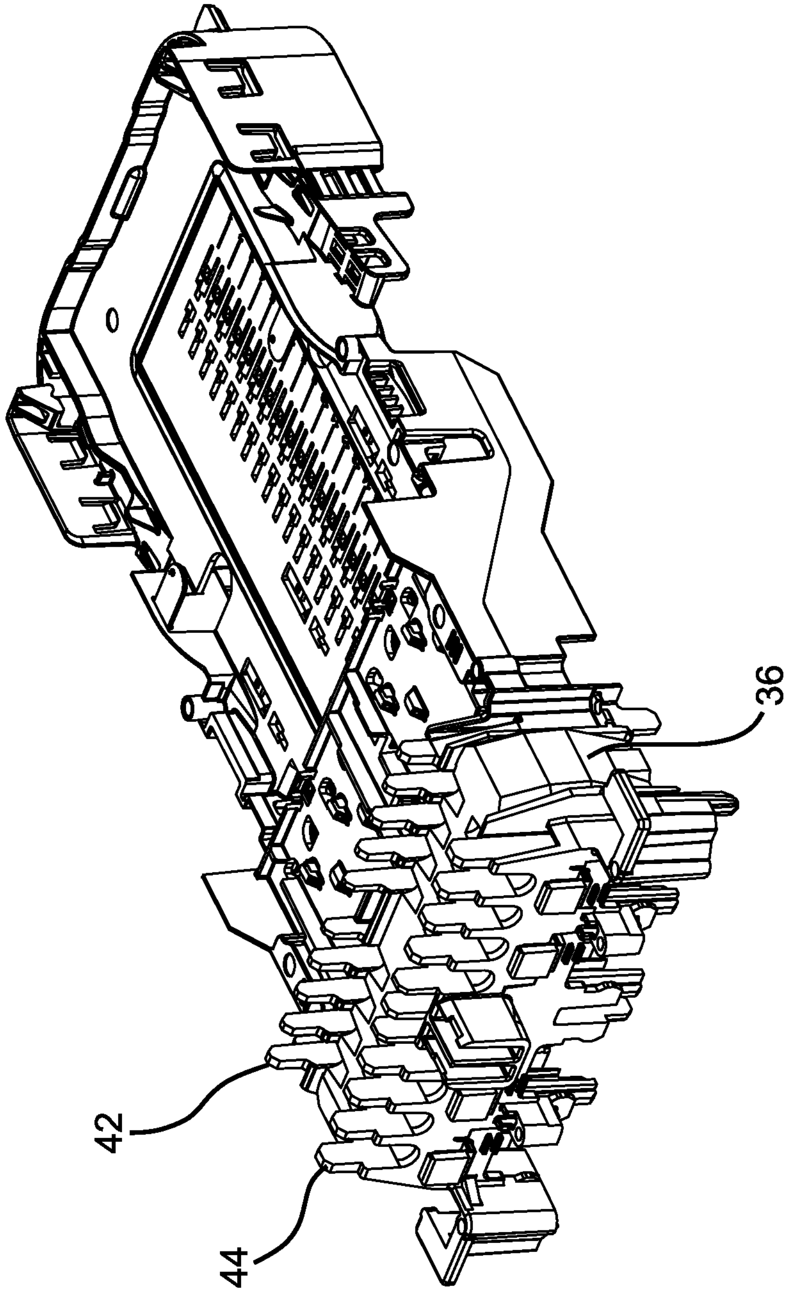
FIG. 4 is a perspective view of the insert of FIG. 2 with upper and lower gel sections of the cable sealing arrangement removed.
Figure 5:
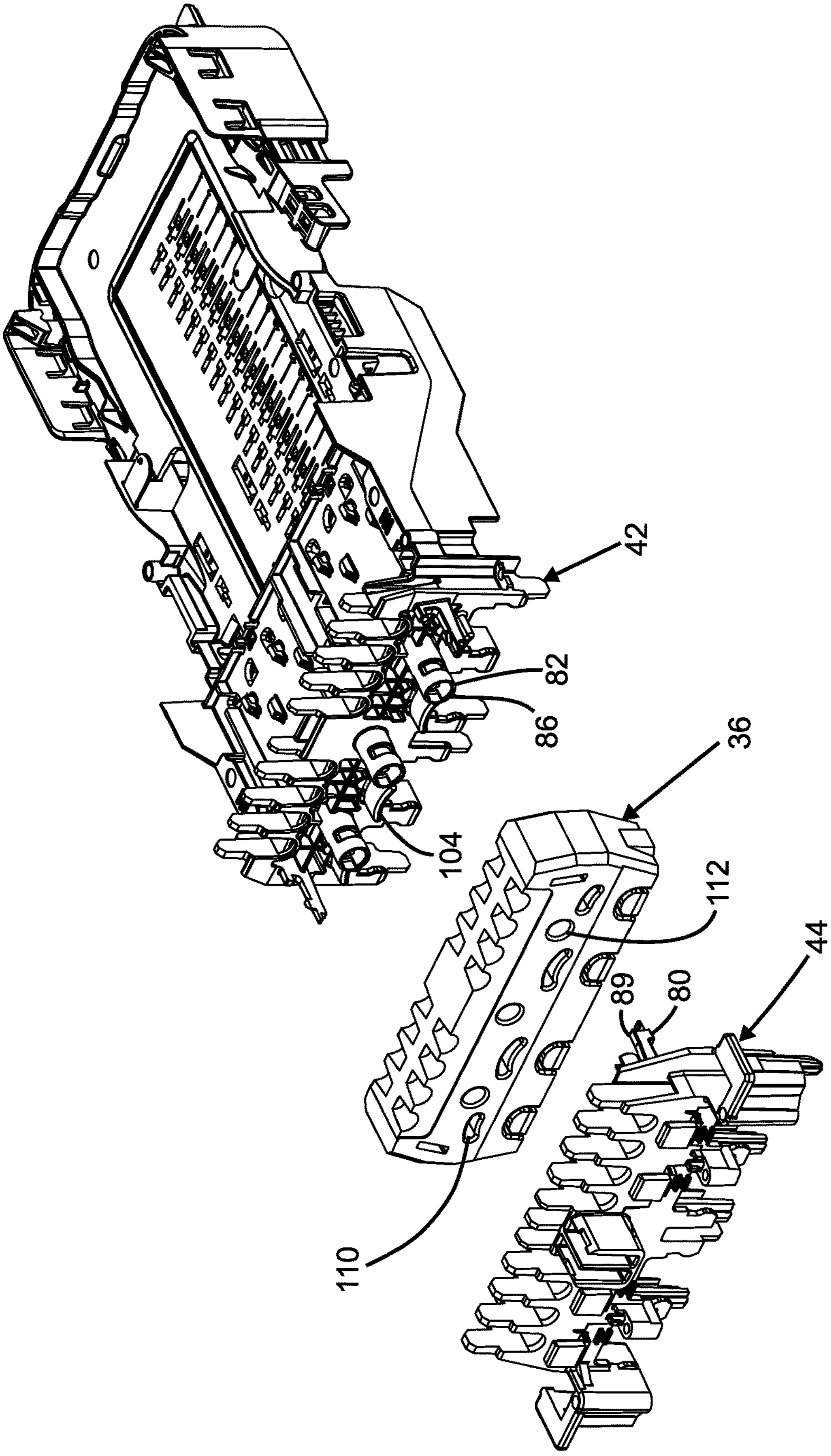
FIG. 5 is an exploded view of the insert of FIG. 4.
Figure 19:
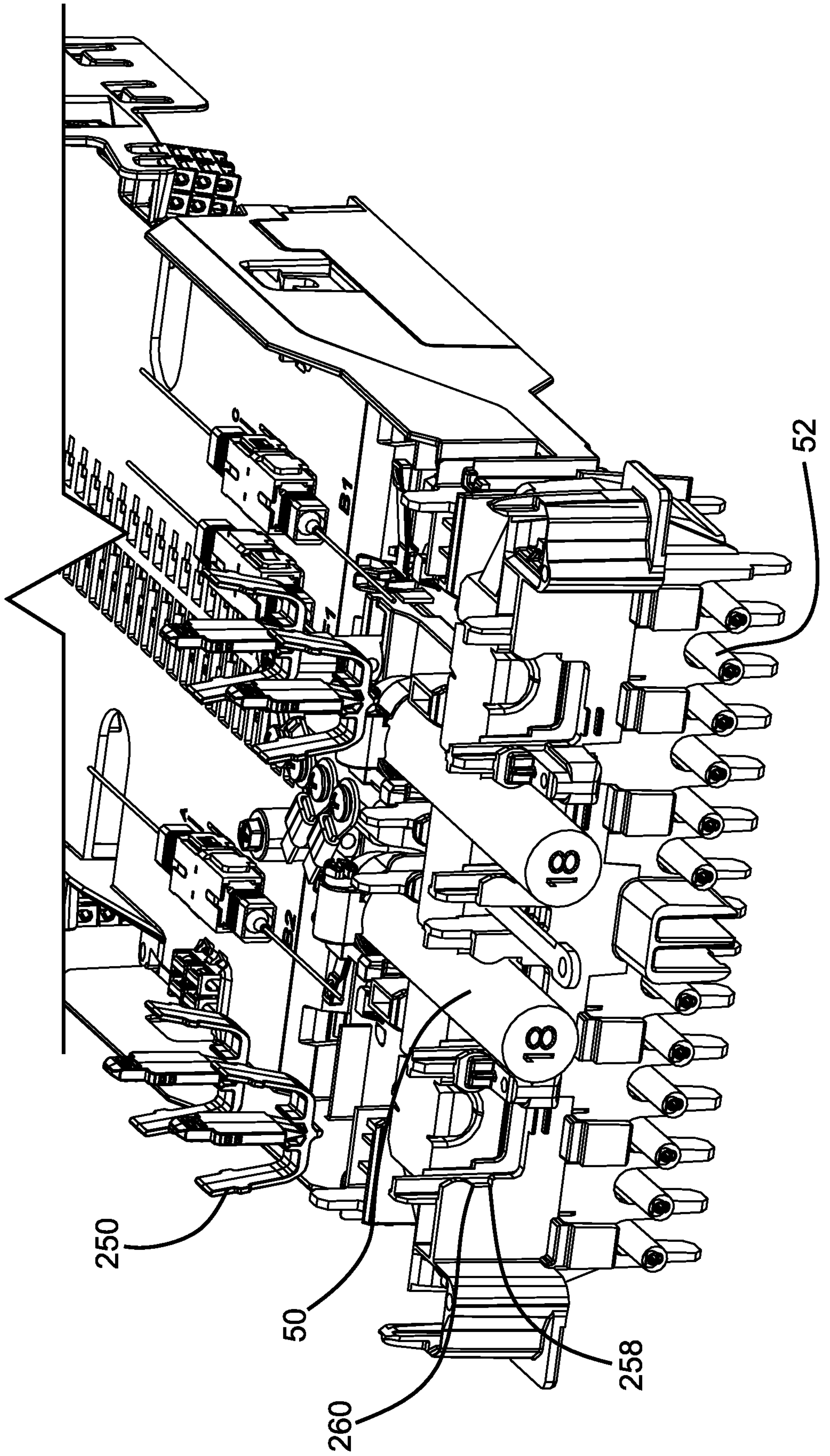
FIG. 19 is a perspective view of the cable sealing arrangement of FIG. 2 with cables routed therethrough and with the upper and lower gel sections removed.
Figure 20:
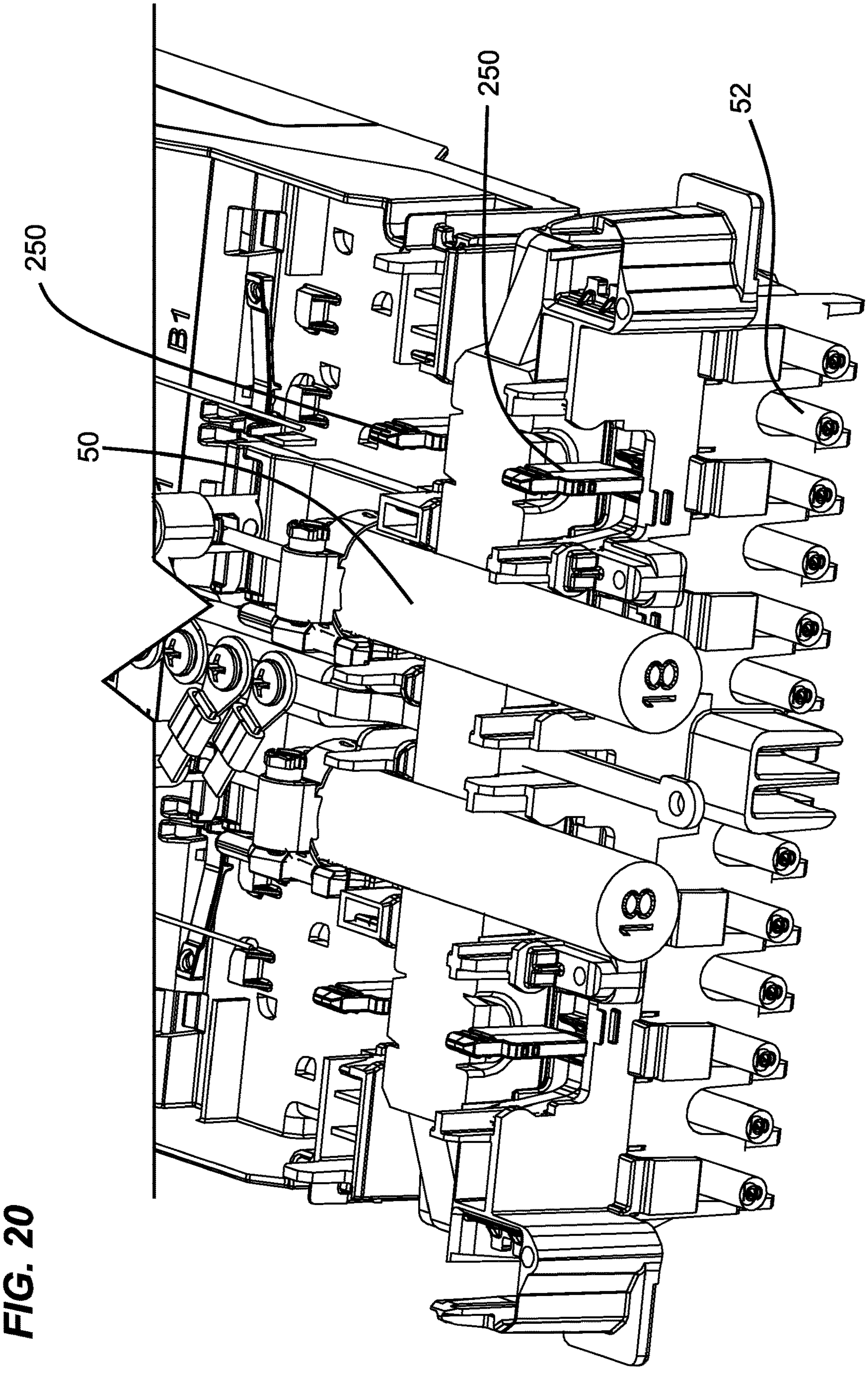
FIG. 20 is another perspective view of the cable sealing arrangement of FIG. 19.

Referring to FIGS. 2, 4 and 5, the cable sealing arrangement 23 also includes inner and outer axial containment barriers 42, 44 between which the middle gel section 36 is mounted such that the middle gel section 36 is carried with the inner and outer axial containment barriers 42, 44 when the inner and outer axial containment barriers 42, 44 are not mounted at the sealed cable entrance of the housing 21. The inner and outer axial containment barriers 42, 44 are separated by the thickness T of the volume of sealing gel 29. The inner and outer axial containment barriers 42, 44 define first cable pass-through locations 46 (e.g., defined by openings such as notches in the barriers, see FIG. 3) spaced apart along the length L of the volume of sealing gel 29 at the first cable pass-through interface 30 and second cable pass-through locations 48 (e.g., defined by openings such as notches defined in the barriers, see FIG. 3) spaced apart along the length L of the volume of sealing gel 29 at the second cable pass-through interface 32. In the depicted example, the second cable pass-through locations 48 are adapted for accommodating larger cables than the first cable pass-through locations 46. In one example, larger cables such as feeder cables are routed through the second cable pass-through interface 32 while smaller cables such as drop cables are routed through the first cable pass-through interface 30. FIGS. 2, 19 and 20 depict feeder cables 50 routed through the second cable pass-through interface 32 and drop cables 52 routed through the first cable pass-through interface 30. It will be appreciated that seal adapters can be used to mount two drop cables at each of the first cable pass-through locations 46.

The cable sealing arrangement 23 also includes first, second and third barrier couplers 54-56 (see FIGS. 5-8) for coupling the inner and outer axial containment barriers 42, 44 together. The barrier couplers 54-56 extend through the middle gel section 36 such that the middle gel section 36 is mounted between and carried with the inner and outer axial containment barriers 42, 44. As indicated above, the middle gel section 36 remains with inner and outer axial containment barriers 42, 44 when the inner and outer axial containment barriers 42, 44 are not mounted at the sealed entrance of the enclosure 20. In contrast, the upper gel section 34 and the lower gel section 38 are adapted to remain with their corresponding housing pieces 24, 26 even when the housing 21 is opened and axial containment barriers 42, 44 are removed from the housing 21. To install cables within the cable sealing arrangement 23, the inner and outer axial containment barriers 42, 44 are removed from the housing 21 with the middle gel section 36 carried therewith. With the containment barriers 42, 44 removed from the housing 21, cables (e.g., feeder cables 50 or drop cable 52) can be inserted into the middle gel section 36 at the cable pass-through locations 46, 48. After the cables have been loaded into the middle gel section 36 at the cable pass-through locations 46, 48, the containment barriers 42, 44 can be reinstalled at the cable entrance location of the housing 21 of the enclosure 20. When the containment barrier 42, 44 is reinstalled at the cable entrance location, the upper and the lower gel sections 34, 38 are received between the containment barriers 42, 44 such that the gel sections 34, 36 and 38 are held in a stacked relation to form the total volume of contiguous sealing gel 29. It will be appreciated that upper and lower ends of the inner axial containment barrier 42 as well as upper and lower ends of the outer axial containment barrier 44 can be received within receivers defined within the first and second housing pieces 24, 26 for reinforcing and fixing the containment barriers 42, 44 against axial movement relative to the housing 21 as the housing 21 is closed and the volume of sealing gel 29 is pressurized due to gel displacement caused by the presence of the cables routed through the sealing gel. It will be appreciated that when the containment barriers 42, 44 are installed in the housing 21 with the cables pre-loaded therein, drop cables 52 located at the first cable pass-through interface 30 are captured between an upper sealing surface 60 of the middle gel section 36 and a lower sealing surface 62 of the upper gel section 34 and feeder cables 50 located at the second cable pass-through interface 32 are captured between a lower sealing surface 64 of the middle gel section 36 and an upper sealing surface 66 of the lower gel section 38.

Figure 8:
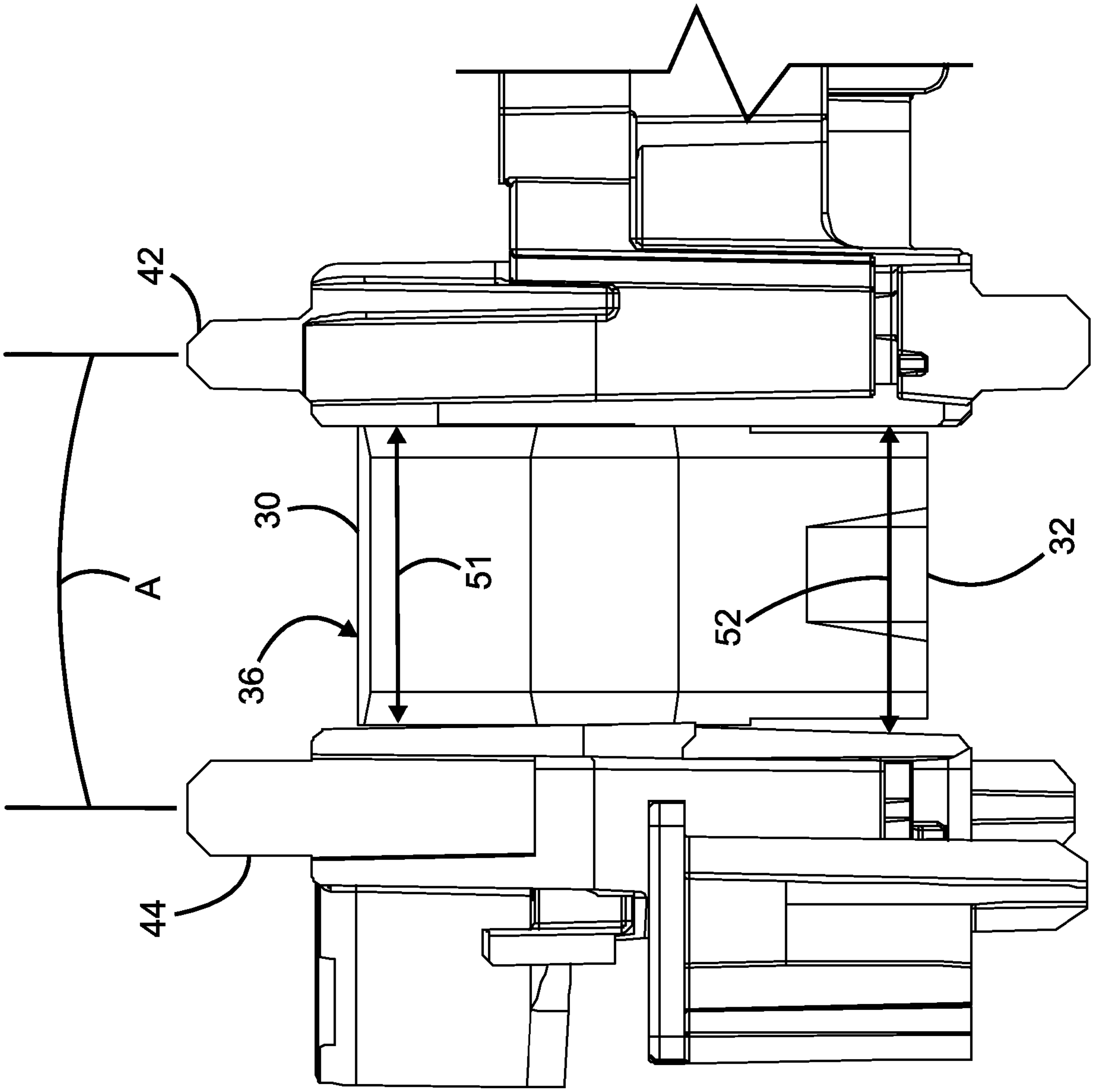
FIG. 8 depicts the inner and outer axial containment barriers of FIG. 7 with the middle gel section mounted between the barriers and with the barriers in a canted configuration.
Figure 9:
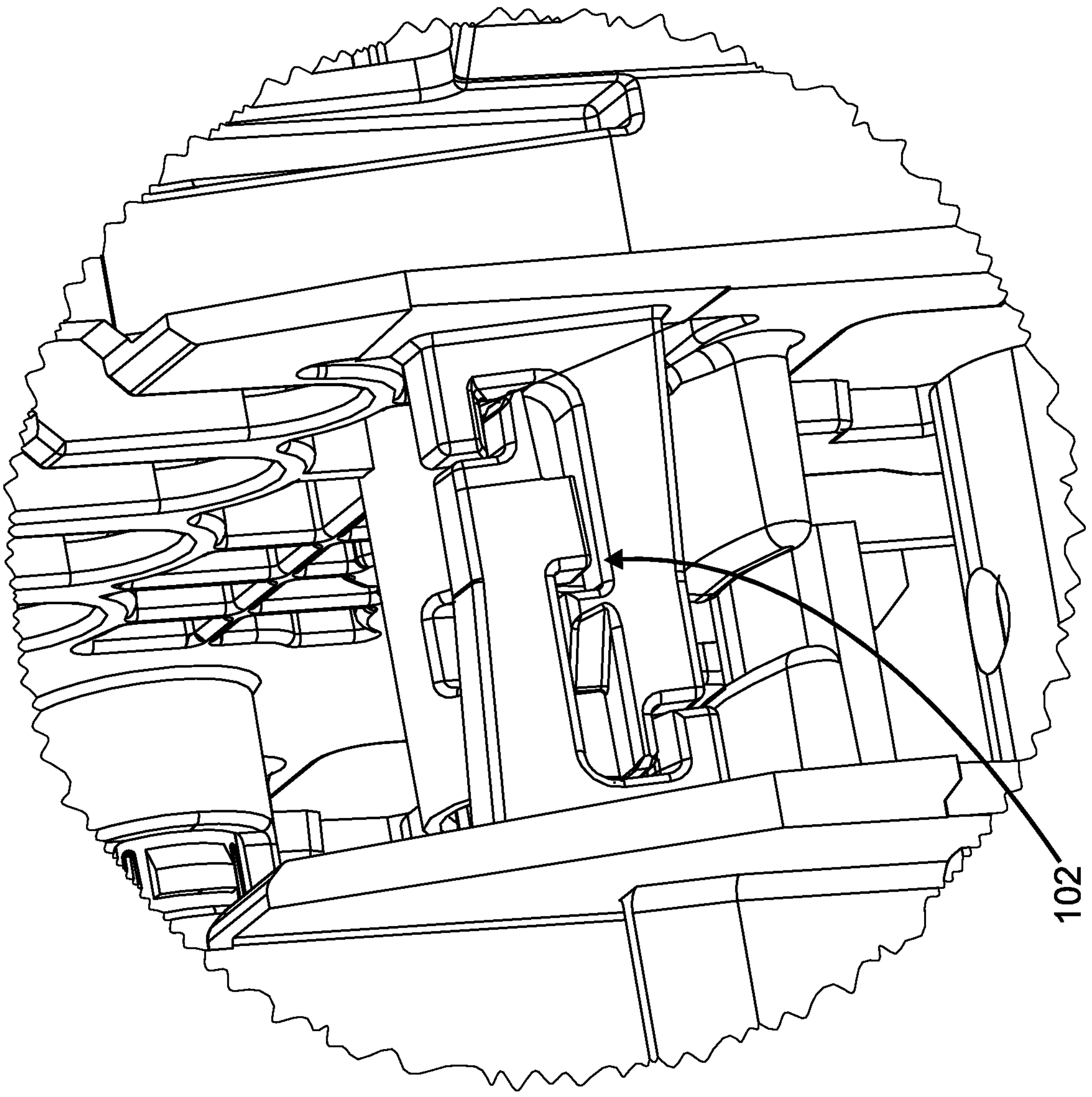
FIG. 9 is a perspective view depicting an end latch for latching the inner and outer axial gel containment barriers together.
Figure 10:
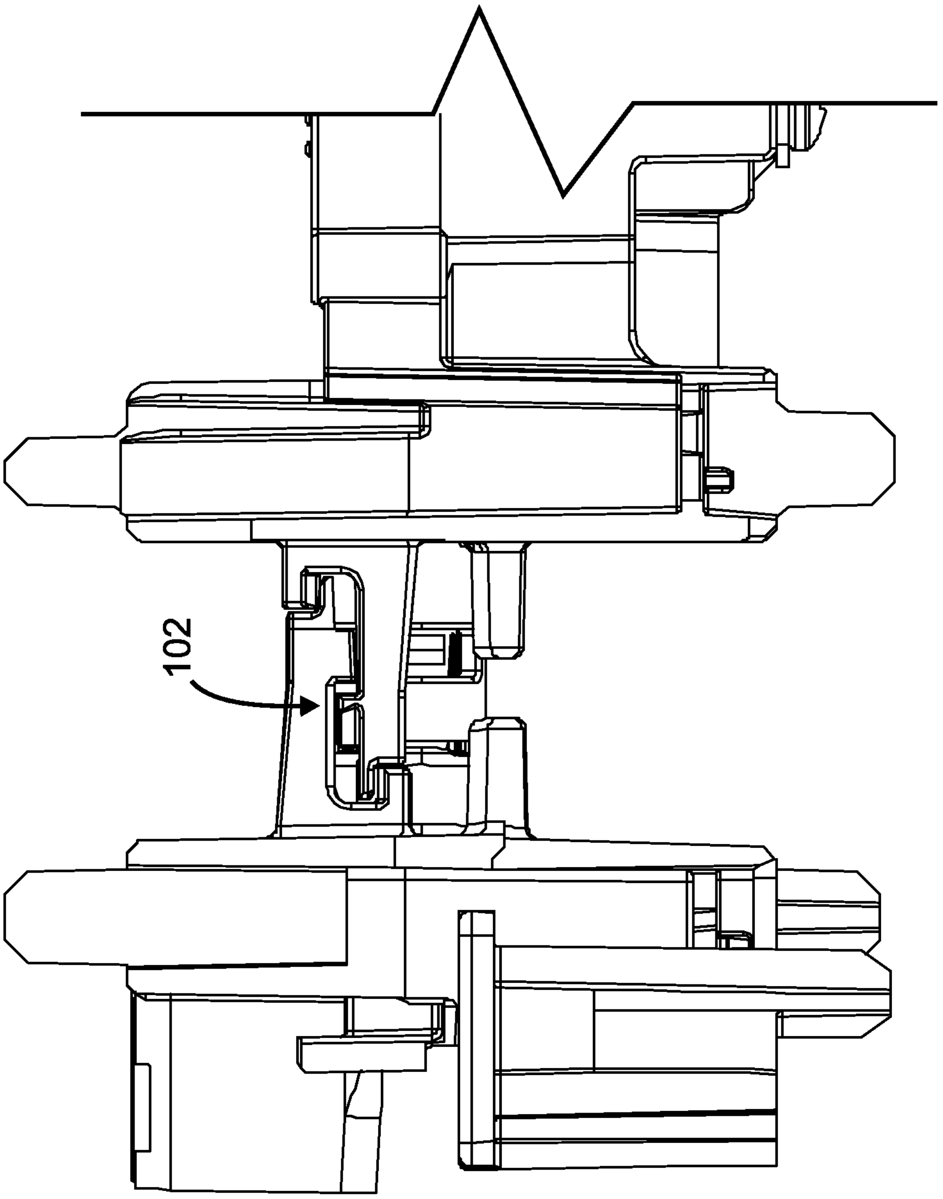
FIG. 10 is another view depicting the end latch of FIG. 9.

The barrier couplers 54-56 are configured such that when cables (e.g., feeder cables 50, drop cables 52, etc.) are loaded into the first and second cable pass-through locations 46, 48 of the middle gel section 36 while the inner and outer axial containment barriers 42, 44 are outside the housing 21 of the enclosure 20, the inner and outer axial containment barriers 42, 44 can move to a canted configuration (see FIG. 8)

relative to one another to distribute pressure within the middle gel section 36. In one example, the inner and outer axial containment barriers 42, 44 define an angle A when in the canted configuration. When in the canted configuration of FIG. 8, a first axial spacing S1 is defined between the inner and outer axial containment barriers 42, 44 at a portion of the middle gel section 36 corresponding to the first cable pass-through interface 30 and a second axial spacing S2 is defined between the inner and outer containment barriers 42, 44 at a portion of the middle gel section 36 corresponding to the second cable pass-through interface 32. The second axial spacing S2 is larger than the first axial spacing S1. The larger axial spacing S2 adjacent the second cable pass-through interface 32 facilitates installing larger cables at the second cable pass-through locations 48 of the middle gel section 36 by providing extra space for the gel to move when displaced by the larger cables. After the cables have been loaded into the middle gel section 36, the inner and outer axial containment barriers 42, 44 can be installed at the sealed cable entrance of the housing 21 where mechanical engagement between the upper and lower ends of the inner and outer axial containment barriers 42, 44 and the first and second housing pieces 24, 26 forces the inner and outer axial containment barriers 42, 44 to move from the canted configuration of FIG. 8 to a more straightened configuration (see FIG. 7). The engagement between the inner and outer axial containment barriers 42, 44 and the first and second housing pieces 24, 26 also fixes the inner and outer axial containment barriers 42, 44 in the more straightened configuration with a uniform or more uniform spacing between the containment barriers 42, 44 along the heights of the containment barriers 42, 44. In certain examples, at least some of the barrier couplers 54, 56 have axial lengths that are variable.

Figure 6:
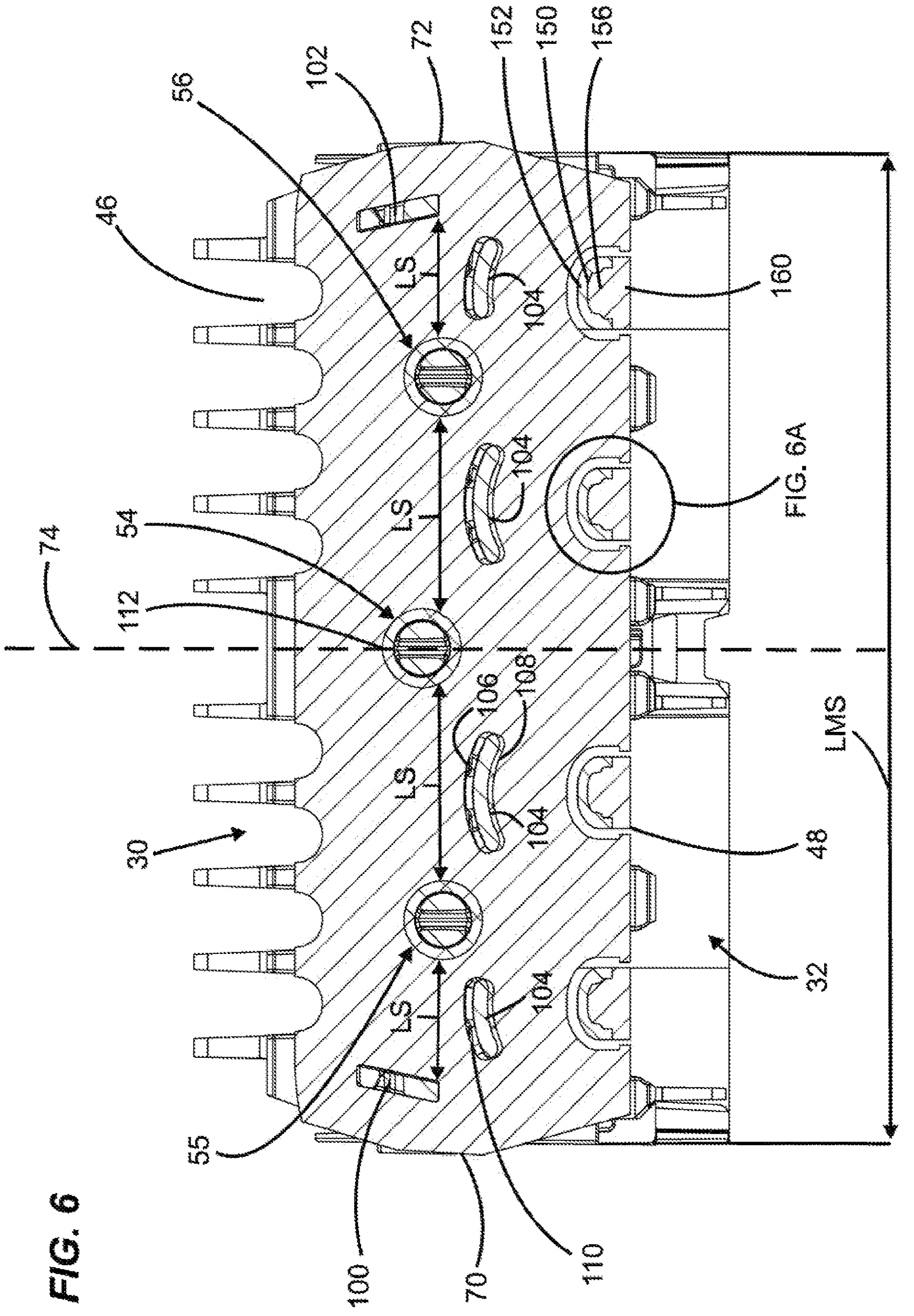
FIG. 6 is a cross-sectional view taken along a vertical cross-sectional plane cut through a middle gel section of the insert of FIG. 4.
Figure 6A:
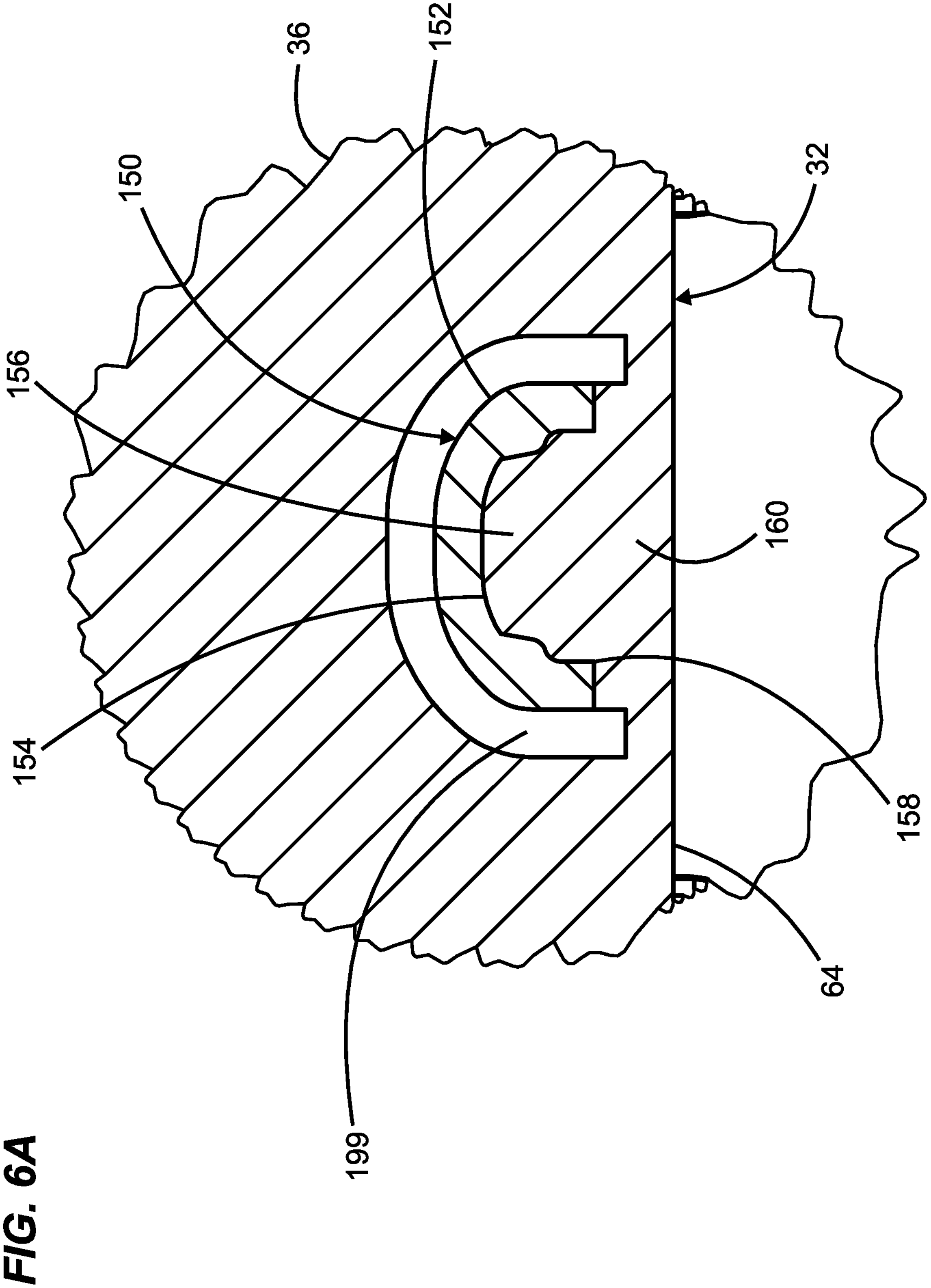
FIG. 6A is an enlarged view of a portion of FIG. 6.

The barrier couplings 54-56 preferably include at least two couplers that are offset relative to one another along the length of the middle gel section 36 and are also offset from one another along the height of the middle gel section 36. Referring to FIG. 6, a length $L_{ms}$ of the middle gel section 36 extends between first and second opposite ends 70, 72. The middle section also includes a thickness $T_{ms}$ and a height $H_{ms}$. The middle gel section 36 includes a midline 74 which divides the length between the first and second ends 70, 72. The first barrier coupler 54 is closer to the midline 74 and closer to the first cable pass-through interface 30 than the second and third barrier couplers 55, 56. In one example, the first barrier coupler 54 is located at the midline 74. The second barrier coupler 55 is closer to the first end 70 of the middle gel section 36 than the first barrier coupler 54 and the third barrier coupler 56 is closer to the second end 72 of the middle gel section 36 and the first barrier coupler 54. The first barrier coupler 54 is axially shorter than the second and third barrier couplers 55, 56 at least when the middle gel section 36 is pressurized between the inner and outer axial containment barriers 42, 44 while the containment barriers 42, 44 are outside the enclosure. In one example, the second and third barrier couplers 55, 56 are symmetric with respect to one another about the midline 74.

Figure 7:
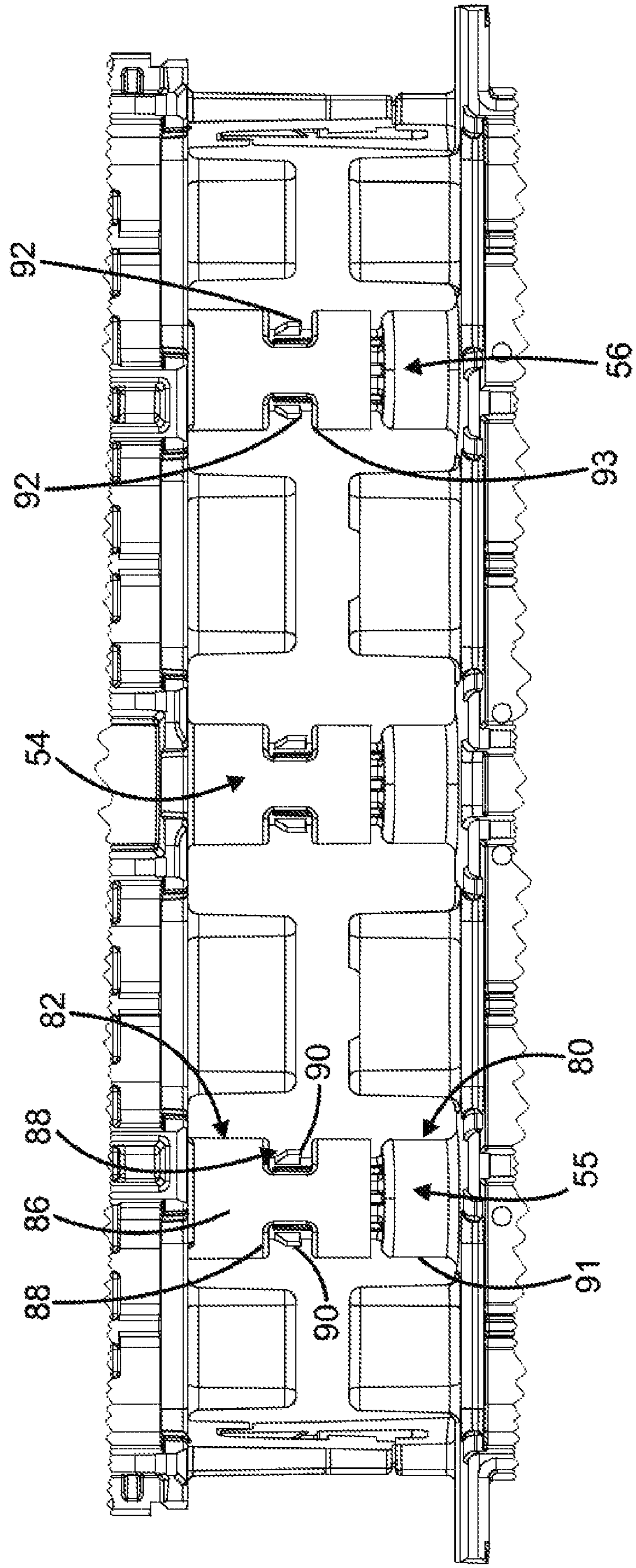
FIG. 7 is a top view of the inner and outer axial gel containment barriers of the cable sealing arrangement of FIG. 2 with the gel sections removed.

Referring to FIGS. 5-8, each of the first, second and third barrier couplers 54-56 includes male and female coupling elements 80, 82 which interlock with one another and which are axially movable relative to one another. The male and female coupling elements 80, 82 of the first barrier coupler 54 have a first fixed range of relative axial movement and the male and female coupling elements 80, 82 of the second and third barrier couplers have a second fixed range of relative axial movement that is larger than the first fixed range of relative axial movement. The first, second and third barrier couplers 54-56 move to maximum axial lengths allowed by the first and second ranges of relative axial movement when the middle gel section 36 is pressurized between the inner and outer axial containment barriers 42, 44 while the containment barriers 42, 44 are outside the enclosure. The first, second and third barrier couplers 54-56 include stops that stop axial extension of the barrier couplers 54, 56 at their respective maximum axial length. In one example, each of the female coupling elements 82 includes a sleeve 86 defining a retention opening 88 and each of the male coupling elements 80 includes latching arms 89 including tabs 90 that fit within the retention openings 88. The latching arms 89 project axially from base sleeves 91. Each tab 90 has a stop surface 92 and each retention opening 88 includes a stop surface 93. The maximum length for each barrier coupler is established when the stop surface 92 of the corresponding tab 90 engages the stop surface 93 of the corresponding retention opening 88. Contact between an end of the sleeve 86 of the female element 82 and an end of the base sleeve 91 of the male element 80 establishes a minimum axial length of each of the barrier couplers. In an alternative example, the first barrier coupling 54 may have minimal to no range of movement. As shown at FIG. 7, more play is provided between the stop surfaces 92, 93 of the barrier couplers 55, 56 as compared to between the stop surfaces 92, 93 of the barrier coupler 54.

In the depicted example, the sealing arrangement further includes first and second supplemental latches 100, 102 for further coupling the inner and outer containment barriers 42, 44 together. The first and second supplemental latches 100, 102 are positioned closer to the first cable pass-through interface 30 then the first barrier coupler 54. The first supplemental latch 100 is closer to the first and 70 of the middle gel section 36 than the second barrier coupler 55. The second supplemental latch 102 is closer to the second end 72 of the middle gel section 36 than the third barrier coupler 56. In certain examples, the supplemental latches 100, 102 have less equal to or less range of axial movement than the first barrier coupler 54, or have no meaningful axial range of movement. The supplemental latches 100, 102 are alternative examples of barrier couplers.

In one example, the barrier couplers 54-56, 100, 102 are separated from one another along the length of the middle gel section 36 by lengthwise spacings LS. As shown at FIGS. 5 and 6, the cable sealing arrangement 23 further includes flow control ribs 104 integrated with one or both of the inner and outer axial containment barriers 42, 44. The flow control ribs 104 project axially into the middle gel section 36 of the volume of sealing gel 29 and are configured to influence gel flow in an orientation along the height H of the volume of sealing gel. In the depicted example, the flow control ribs 104 are integrated with the inner axial containment barrier 42. The flow control ribs 104 are positioned closer to the second cable pass-through interface 32 than the barrier couplers 54-56, 100, 102 and are positioned beneath and at least partially in line with the lengthwise spacings LS. In one example, the flow control ribs are curved and include convex sides 106 that face toward the first cable pass-through interface 30 and concave sides 108 that face toward the second cable pass-through interface 32. At least some of the flow control ribs 104 extend across a majority of the corresponding lengthwise spacing LS beneath which they are positioned. In certain examples, the inner and outer axial containment barriers 42, 44 and the middle gel section 36 are configured such that when the middle gel section 36 is installed on the inner and outer axial containment barriers 42, 44 while outside the enclosure, the flow control ribs 104 bias a portion of the volume of the middle gel section 36 toward the second cable pass-through interface 32. In one example, the flow control ribs 104 fit within predefined axial slots 110 defined within the middle gel section 36 and the first, second and third barrier couplers 54-56 fit within predefined openings 112 defined by the middle gel section 36. The predefined axial slots 110 and the predefined openings 112 are spaced from one another in the height orientation a distance less than a spacing in the height orientation between the flow control ribs and the first, second and third barrier couplers 54, 55, 56 such that when the flow control ribs 104 fit within their corresponding predefined axial slots 110 and the barrier couplers 54-56 fit within their corresponding predefined openings 112 the flow control ribs 104 bias a portion of the volume of the middle gel section 36 downwardly toward the second cable pass-through interface 32.

Figure 11:
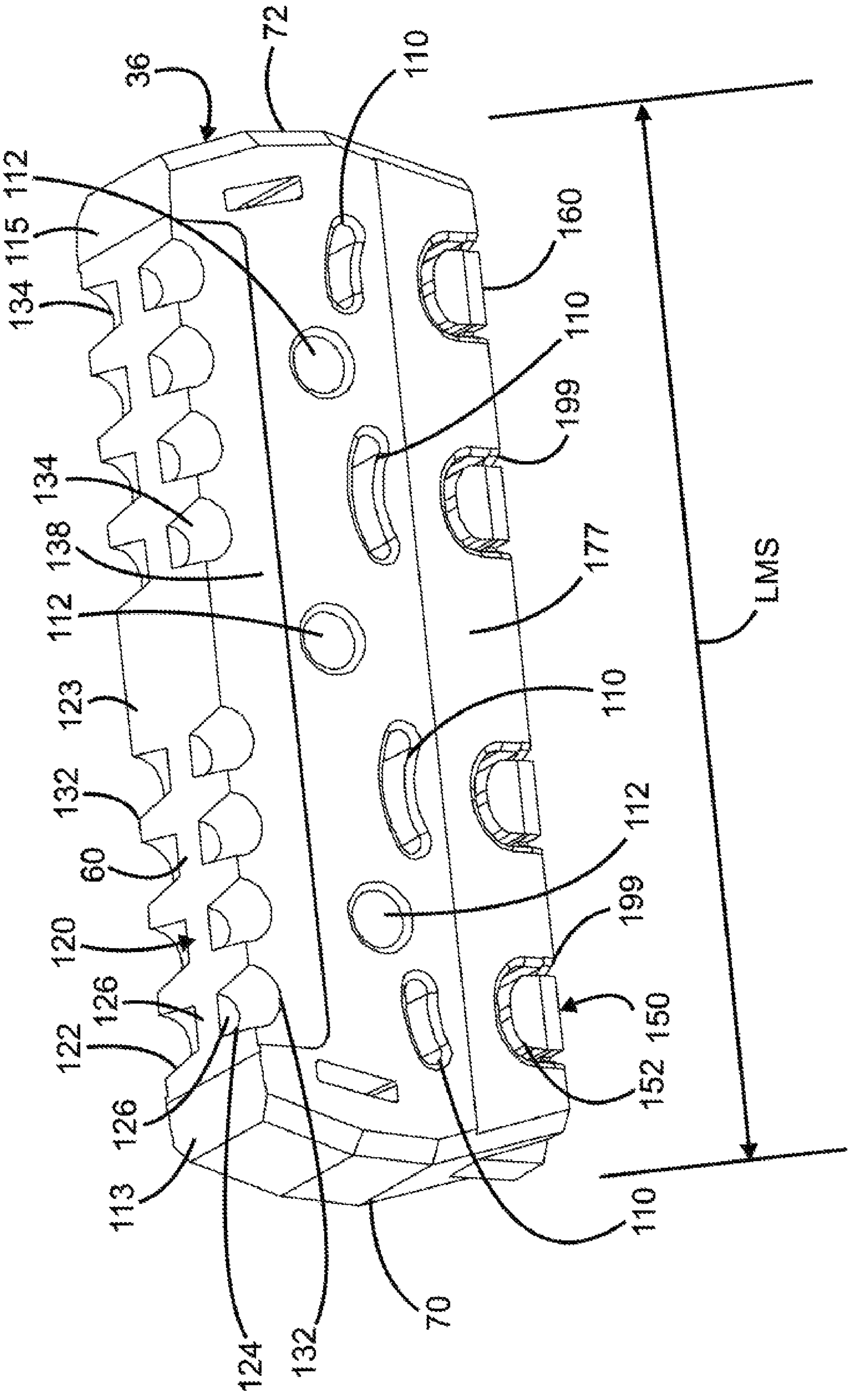
FIG. 11 is an upper, outer perspective view of the middle gel section of the cable sealing arrangement of FIG. 2.
Figure 24:
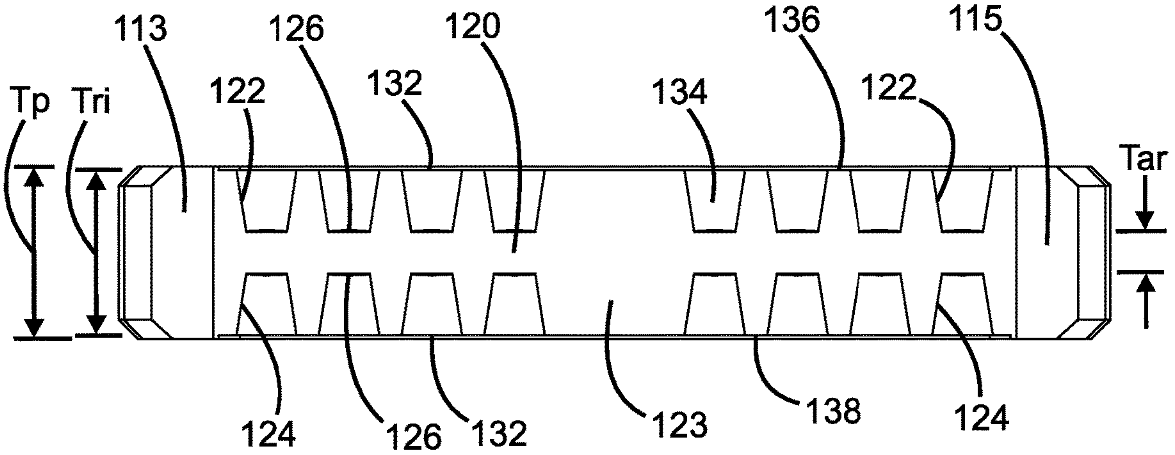
FIG. 24 is a top view of the middle gel section of FIGS. 11 and 12.
Figure 25:
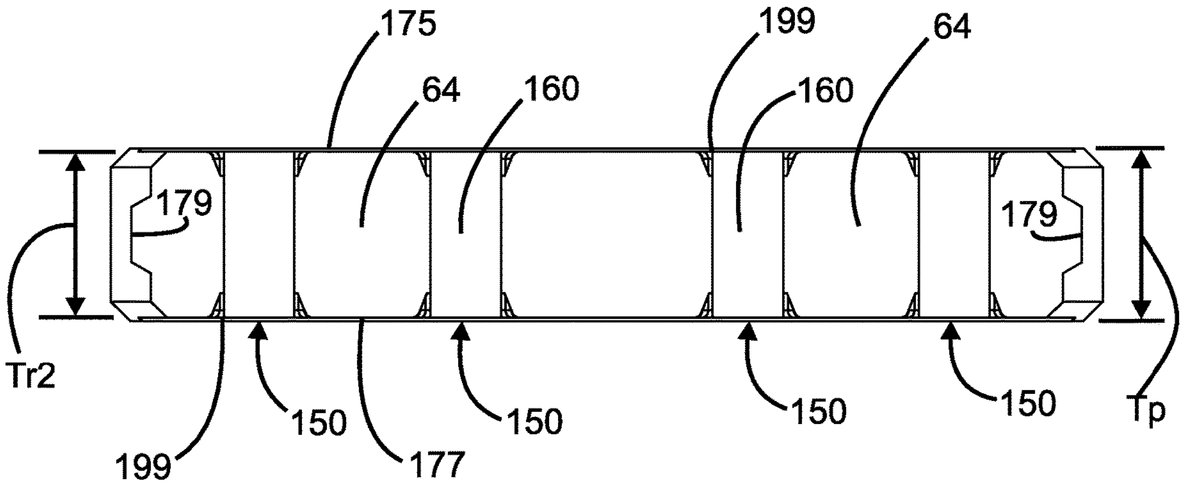
FIG. 25 is a bottom view of the middle gel section of FIGS. 11 and 12.
Figure 27:
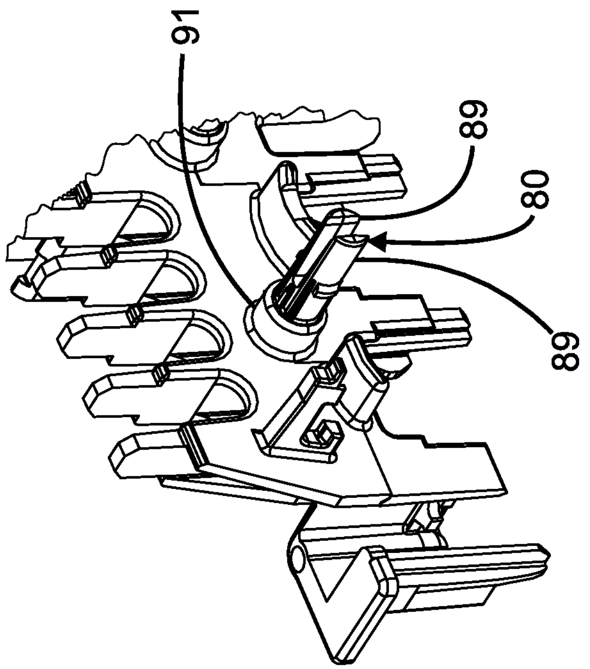
FIG. 27 is a perspective view of a male coupling element of one of the barrier couplers of the cable sealing arrangement of FIG. 1.
Figure 26:
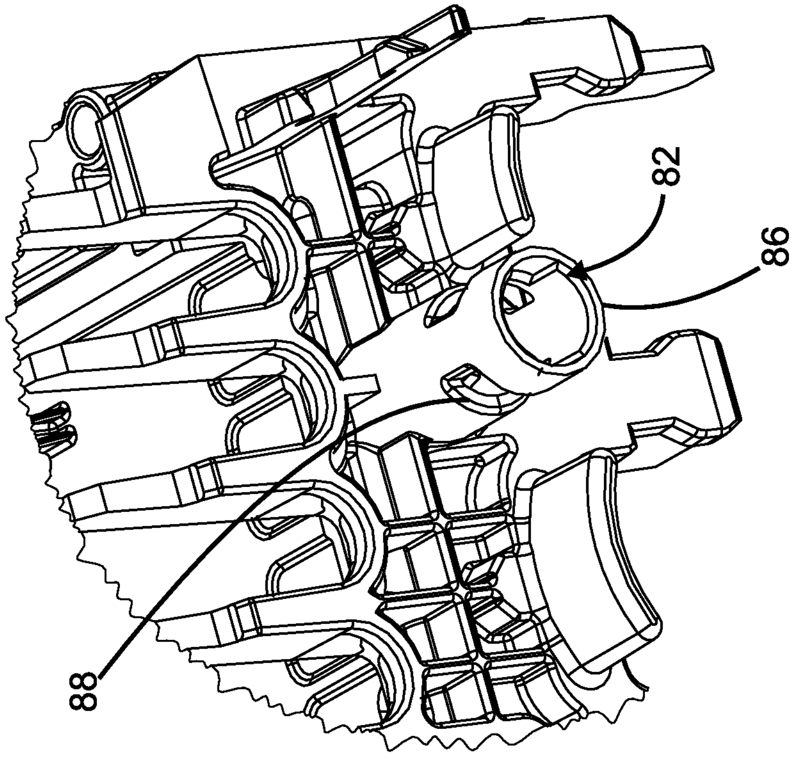
FIG. 26 is a perspective view of a female coupling element of one of the barrier couplers of the cable sealing arrangement of FIG. 1.
Figure 28:
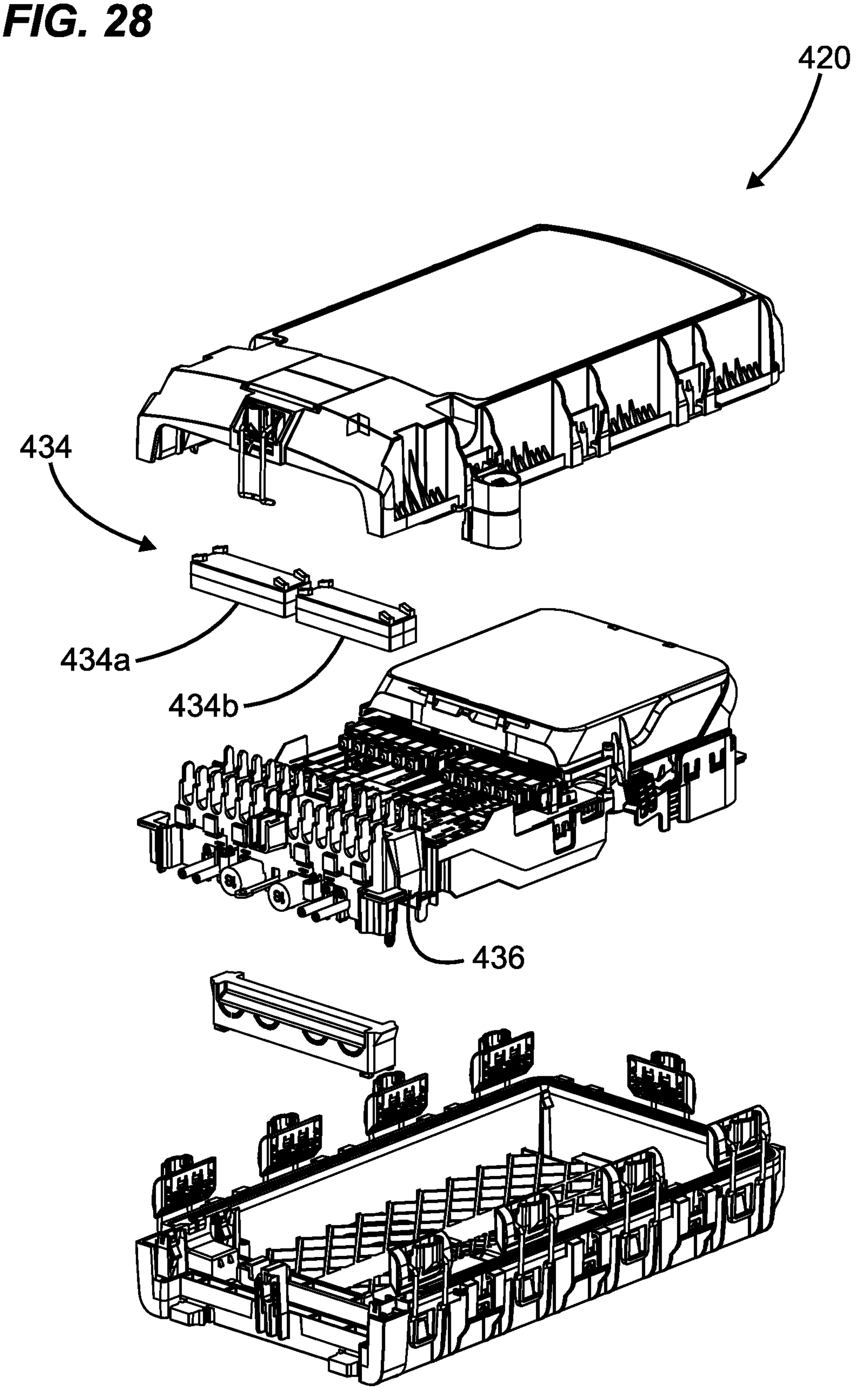
FIG. 28 is an exploded view of another enclosure having a cable sealing arrangement in accordance with the principles of the present disclosure.
Figure 29:
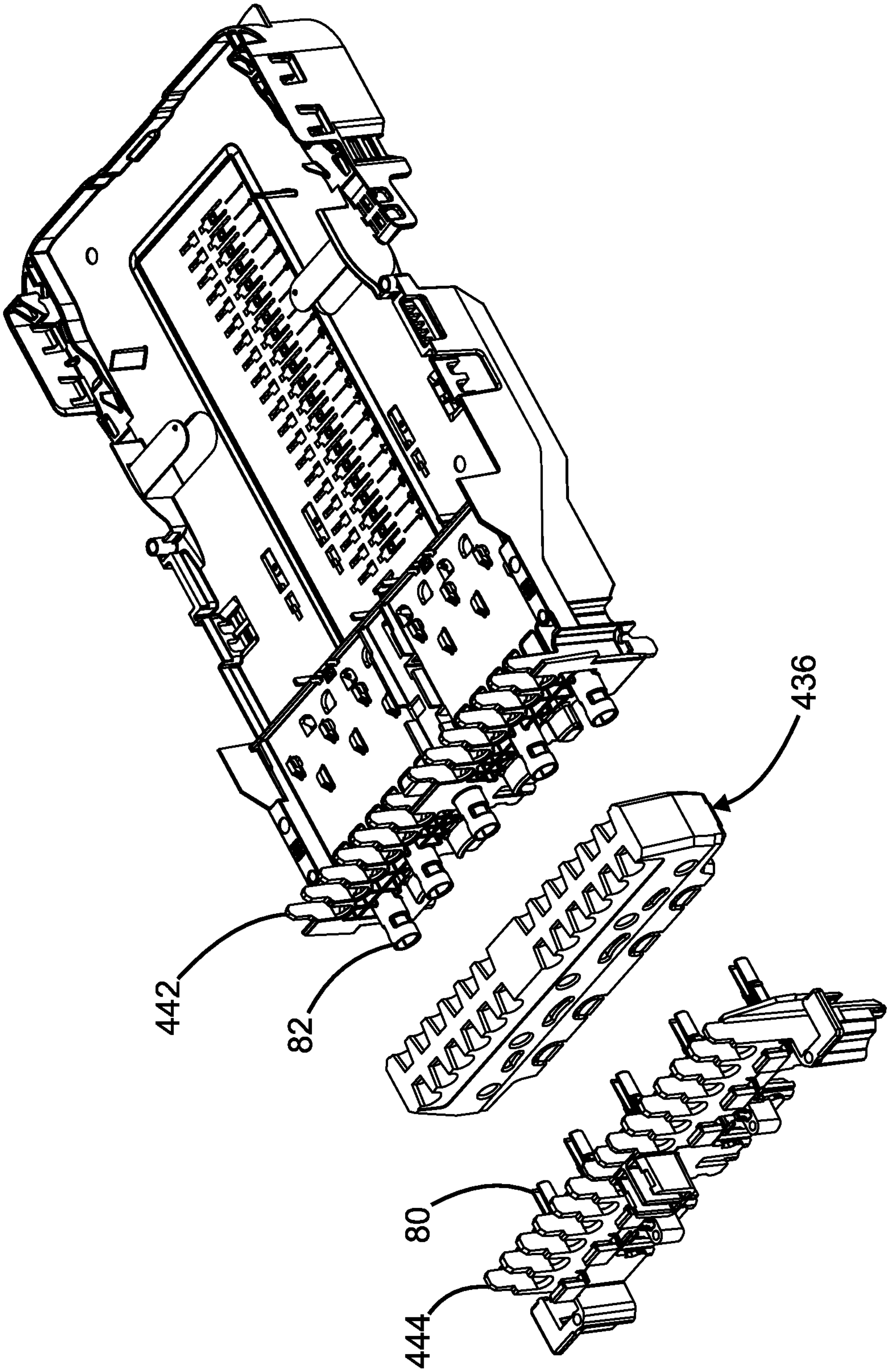
FIG. 29 is an exploded view showing the cable sealing arrangement of the enclosure of FIG. 28 with upper and lower sealing sections removed.
Figure 30:
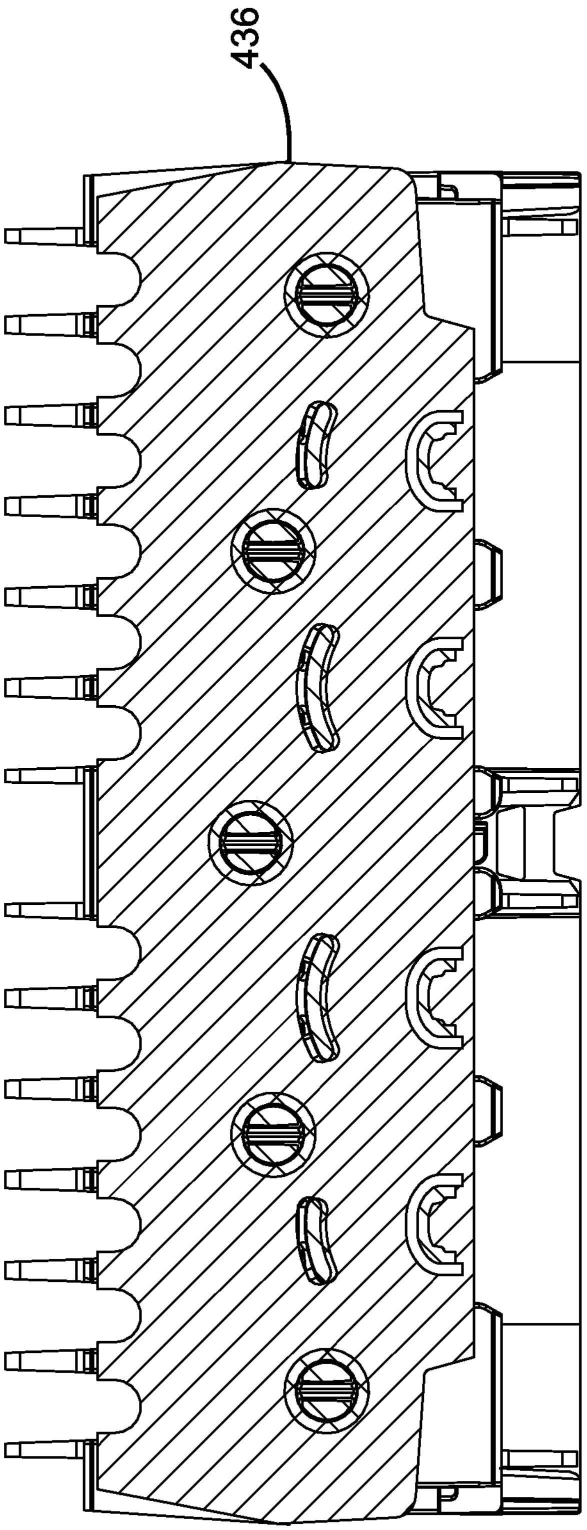
FIG. 30 is a cross-sectional view taken along a vertical cross-sectional plane cut through the middle gel section of the cable sealing arrangement of FIG. 28.
Figure 31:
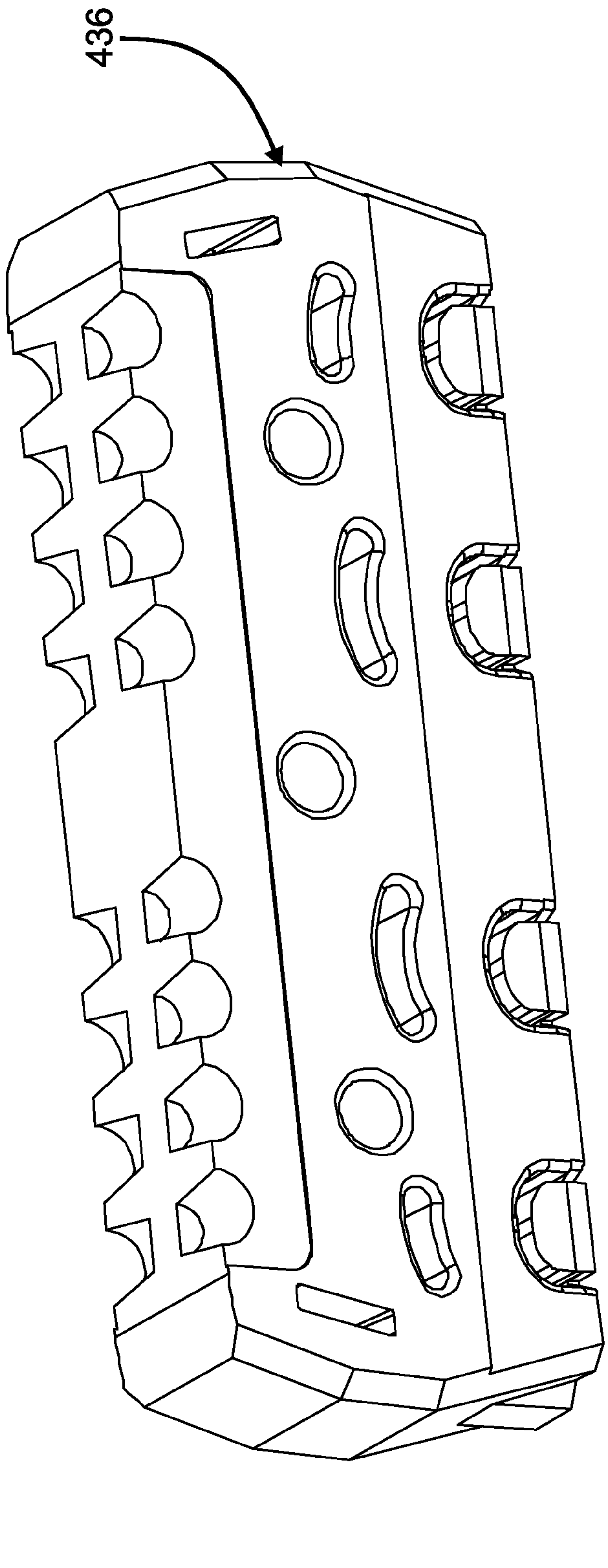
FIG. 31 is an outer, upper perspective view of the middle gel section of the cable sealing arrangement of FIG. 28.
Figure 32:
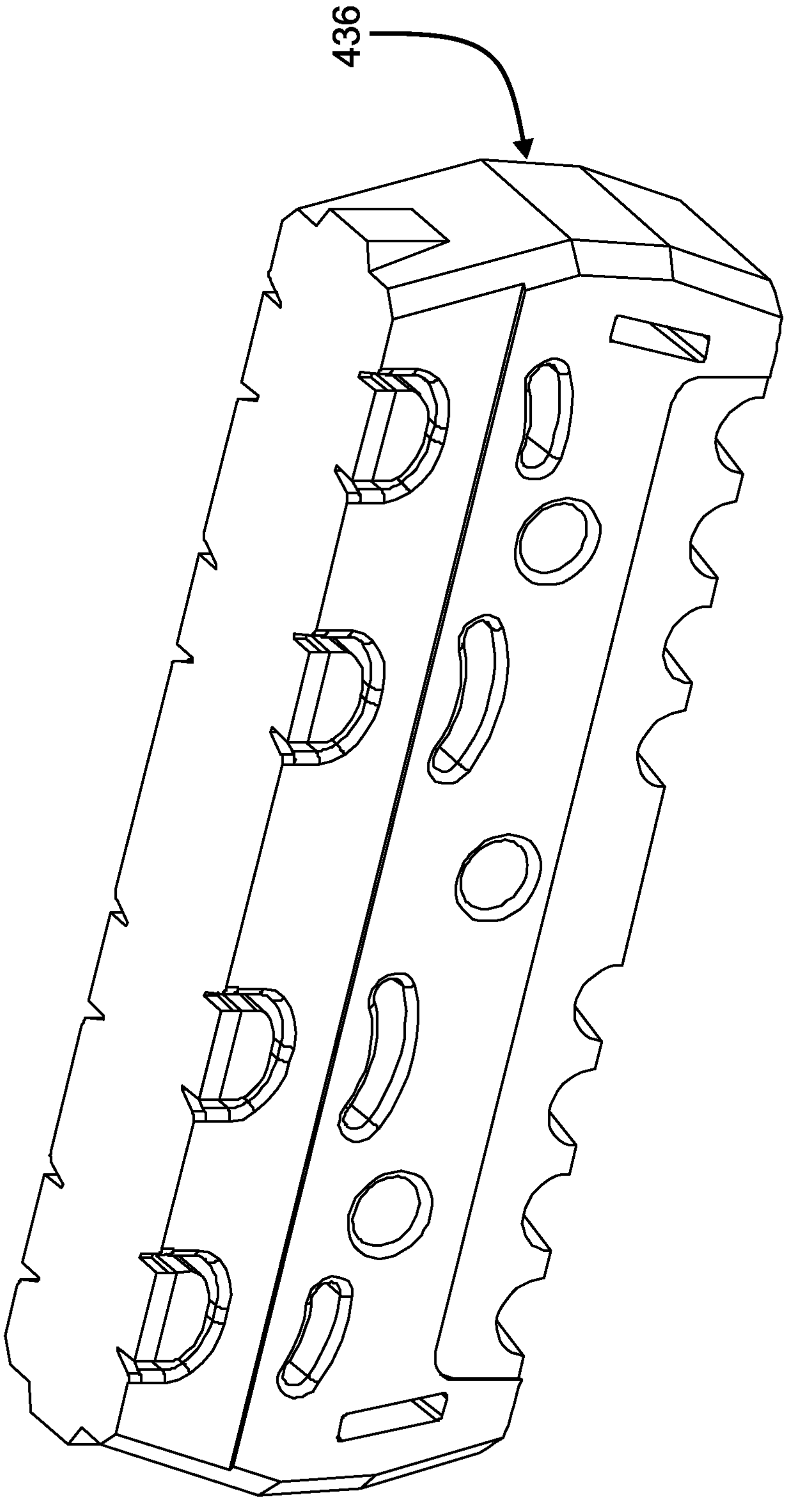
FIG. 32 is an inner, lower perspective view of the middle gel section of the cable sealing arrangement of FIG. 28.
Figure 33:
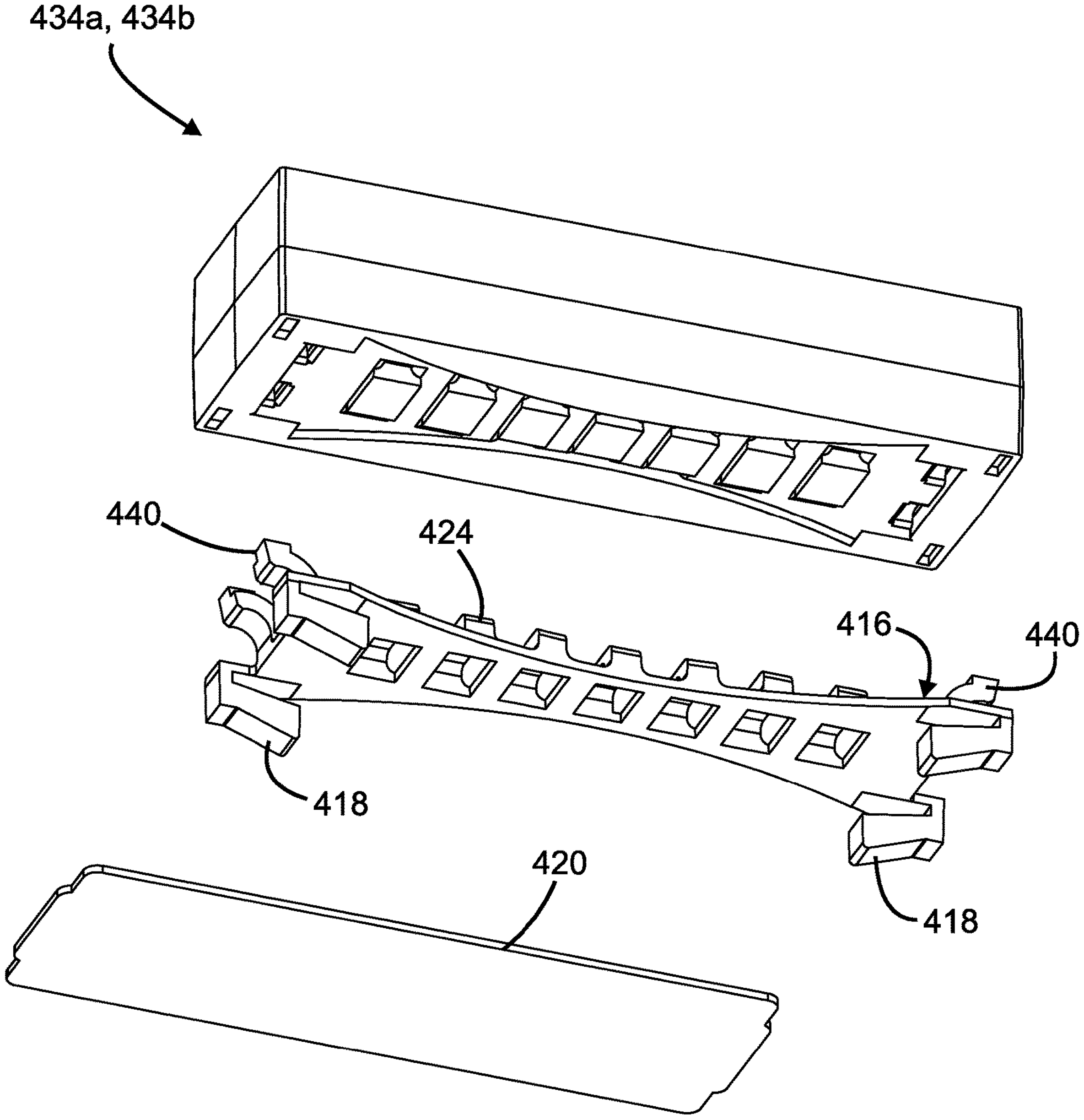
FIG. 33 is an exploded view depicting one of the upper gel sections of the cable sealing arrangement of FIG. 28.

Referring to FIGS. 5, 11 and 24, the middle gel section 36 includes a central sealing rib 120 at the first cable pass-through interface 30 that extends along the length $L_{ms}$ of the middle gel section 36 between the opposite ends 70, 72 of the middle gel section 36. The first cable pass-through locations 46 are defined by sets of inner and outer tapered cable receptacles 122, 124 having closed minor ends 126 defined respectively at inner and outer sides of the central sealing rib 120 and open major ends 132 spaced axially from the central sealing rib 120. The inner and outer tapered cable receptacles 122, 124 have open sides 134 that face toward the upper gel section 34. The central sealing of 120 has an axial rib thickness $T_{ar}$ that is less than a primary axial thickness $T_p$ of the middle gel section 36. In one example, the inner and outer tapered cable receptacles 122, 124 have truncated conical shapes. In one example, the middle gel section 36 includes recessed inner and outer face surfaces 136, 138 that encompass the open major ends 132 of the inner and outer tapered cable receptacles 122, 124. The middle gel section 36 defines a recessed thickness $T_{r1}$ at the recessed inner and outer face surfaces 136, 138 that is greater than the rib axial thickness $T_{ar}$ and less than the primary thickness $T_p$. In certain examples, the recessed inner and outer face surfaces 136, 138 are inwardly offset from the interiors of the inner and outer axial containment barriers 42, 44 such that when cables are loaded into the first cable pass-through locations 46, the gel of the middle gel section 36 adjacent to the first cable pass-through locations 46 can deform about and conform to the outer shapes of the cables prior to engaging and sticking to the interiors of the inner and outer axial containment barriers 42, 44. In the depicted example, the upper gel section 34 which opposes the central sealing rib 120 does not include sets of inner and outer tapered cable receptacles at the first cable pass-through interface 30 which corresponds to the sets of inner and outer tapered cable receptacles 122, 124 defined by the middle gel section 36 at the first cable pass-through interface 30. Instead, the upper gel section 34 includes a central sealing rib 140 without inner and outer tapered cable receptacles. The central sealing rib 120 of the middle gel section 36 defines the upper sealing surface 60 of the first cable pass-through interface 30 that engages the corresponding lower sealing surface 62 of the first cable pass-through interface 30 defined by a central sealing rib 140 of the upper gel section 34. The cable receptacles 122, 124 are separated into two groups by a central section 123 centrally located between the ends 70, 72 that is free of cable receptacles 122, 124. End sections 113, 115 at the ends 70, 72 and the central section 123 are thicker than the central sealing rib 120 and assist in reinforcing the central sealing rib 120.

As best shown in FIGS. 5, 6, 6A, 12 and 25, the middle gel section 36 includes removable gel containers 150 at the second to cable pass-through interface 32 that can be removed from the main body of the middle gel section 36 to reduce the volume of sealing gel at the second cable pass-through interface 32 to accommodate larger cables at the second cable pass-through locations 48. It will be appreciated that the gel containers 150 can remain attached to the main body of the middle gel section 36 to accommodate smaller cables at the second cable pass-through locations 48. The removable gel containers 150 are positioned to correspond with the second cable pass-through locations 48 and are overmolded within the main gel body of the middle gel section 36. The gel containers 150 include containment bodies 152 that extend through the thickness of the sealing gel (e.g., through the thickness of the middle gel section 36). In certain examples, the containment bodies 152 are made from a material having a composition that is harder than the material forming the sealing gel of the sealing arrangement. In certain example, the material compositions of the sealing gel and the containment bodies include the same base material (e.g., silicone). The containment bodies 152 define cavities 154 which contain first removable portions 156 of the sealing gel. The first removable portions 156 of the sealing gel extend to open sides 158 of the containment bodies 152. Second removable portions 160 of the sealing gel extend beyond the open sides 158 of the containment bodies 152 to the second cable pass-through interface 32 when the gel containers 150 have not been removed from the middle gel section 36. The second removable gel portions 160 cooperate with the sealing gel of the main body of the middle gel section 36 to define the lower sealing surface 64 at the second cable pass-through interface 32. The lower sealing surface 64 is adapted to engage the corresponding upper sealing surface 66 defined by the central sealing rib 140 of the lower gel section 38.

In certain examples, the containment bodies 152 each have a different color than the color of the volume of sealing gel. In certain examples, the containment bodies 152 are generally rectangular and include a length l, width w and a depth d. In certain examples, the open sides 158 of the containment bodies 152 are rectangular. In certain examples, containment walls 163 of the containment bodies 152 have outer surfaces 164 that face away from the open sides 158 and have convex curvatures as the outer surfaces 164 extend across the width w. In certain examples, the containment walls 163 of the containment bodies 152 define through-holes 166 opposite the open sides 158 which provide gel communication between the first removable portions 156 and a non-removable portion defining the main body of the sealing gel of the middle gel section 36. The middle gel section 36 includes recessed inner and outer face surfaces 175, 177 encompassing the ends of the gel containers 150. The middle gel section 36 defines a recessed thickness $T_{r2}$ at the recessed inner and outer face surfaces 175, 177 that is greater than the rib axial thickness $T_{ar}$ and less than the primary thickness $T_p$. In certain examples, the recessed inner and outer face surfaces 175, 177 are inwardly offset from the interiors of the inner and outer axial containment barriers 42, 44 such that when cables are loaded into the second cable pass-through locations 48, the gel of the middle gel section 36 adjacent to the second cable pass-through locations 48 can deform about and conform to the outer shapes of the cables prior to engaging and sticking to the interiors of the inner and outer axial containment barriers 42, 44.

Figure 12:
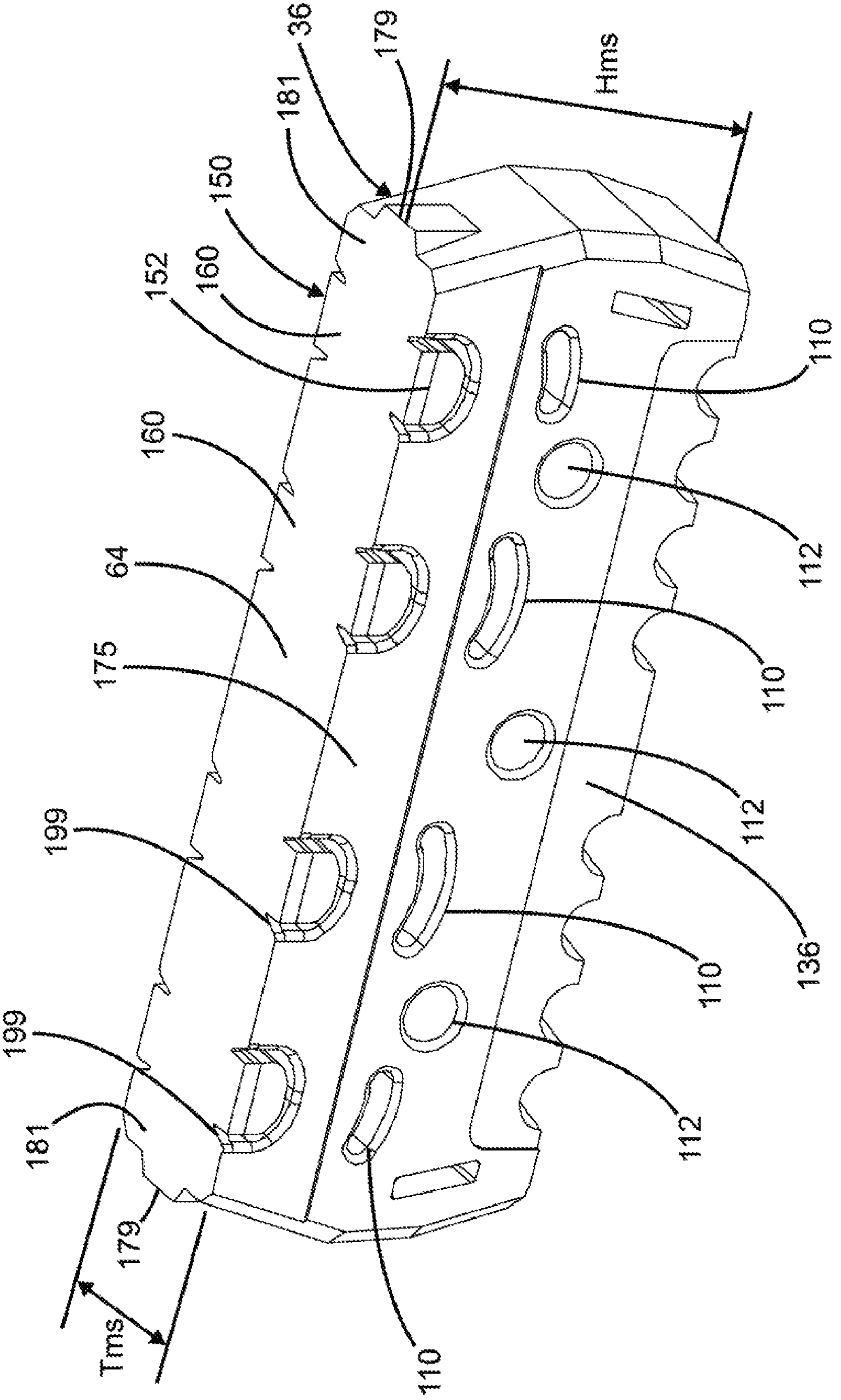
FIG. 12 is a lower, inner perspective view of the middle gel section of FIG. 11.
Figure 13:
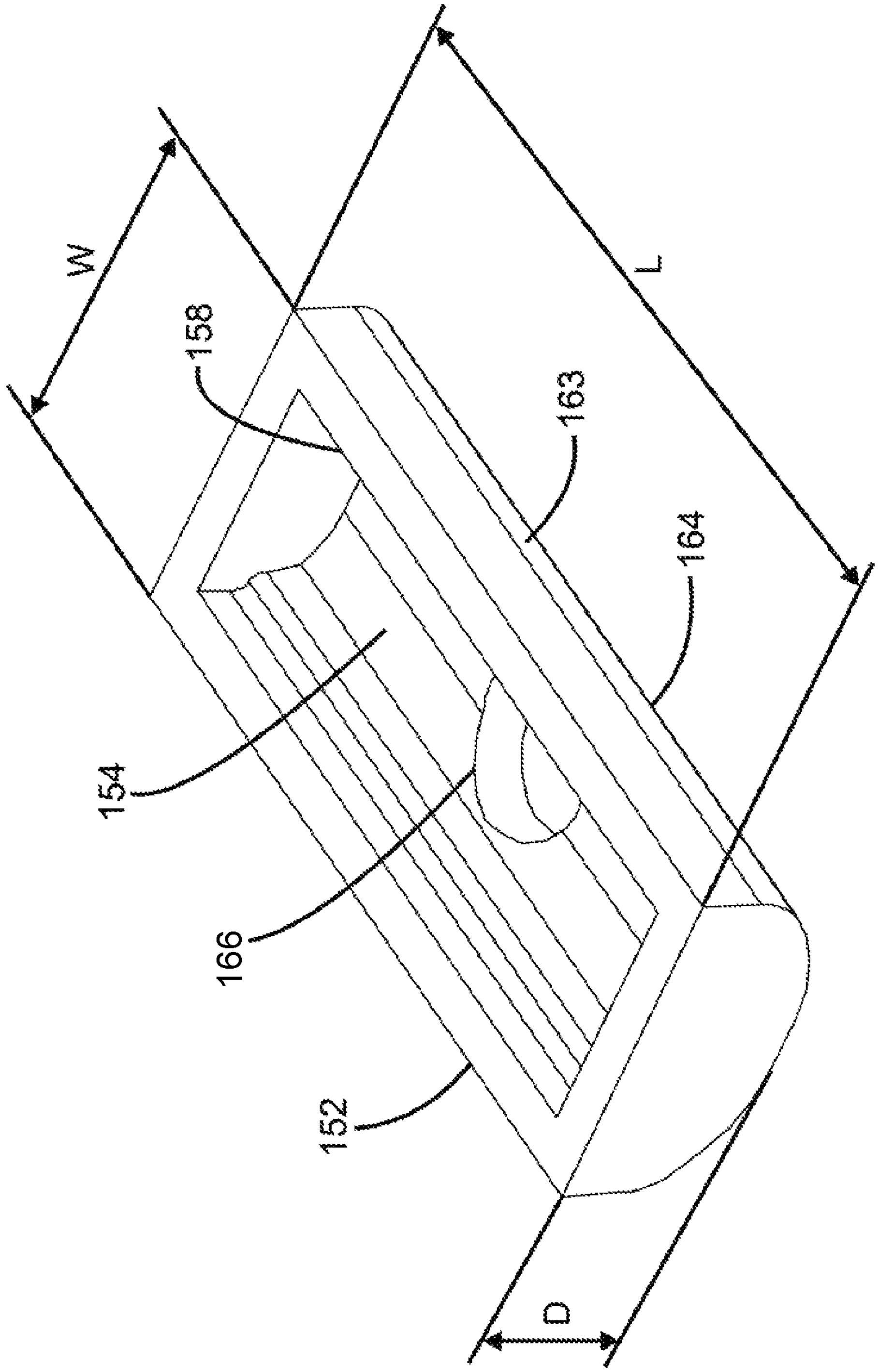
FIG. 13 is a perspective view of a gel containment body of the type over molded within the middle gel section of FIGS. 11 and 12.
Figure 14:
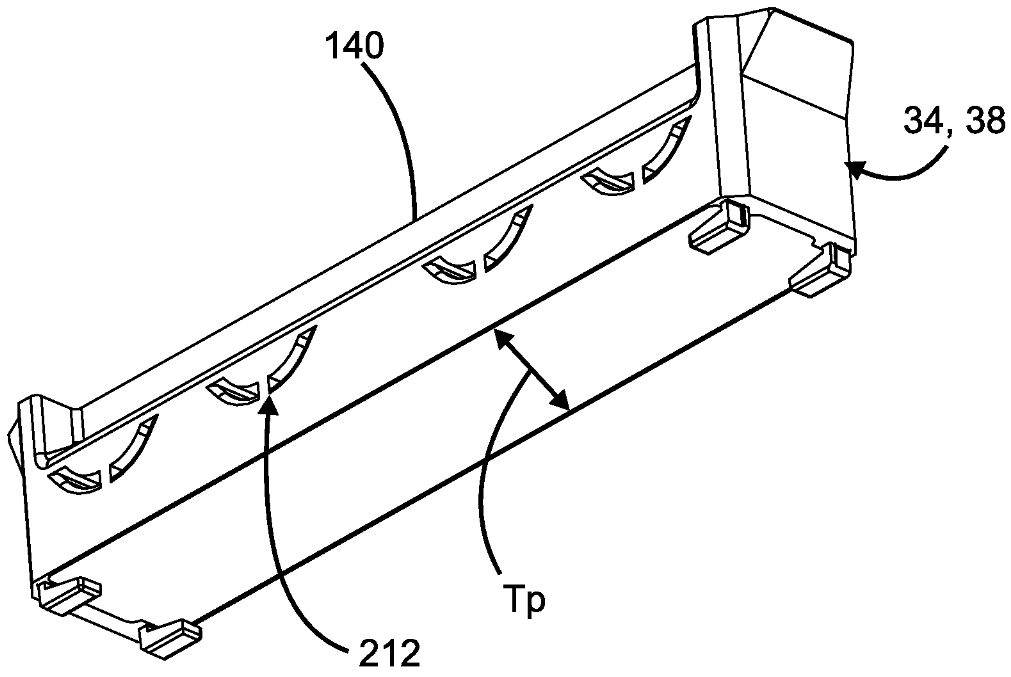
FIG. 14 is a perspective view of a gel section representative of the upper and lower gel sections of the cable sealing arrangement of FIG. 2.
Figure 15:
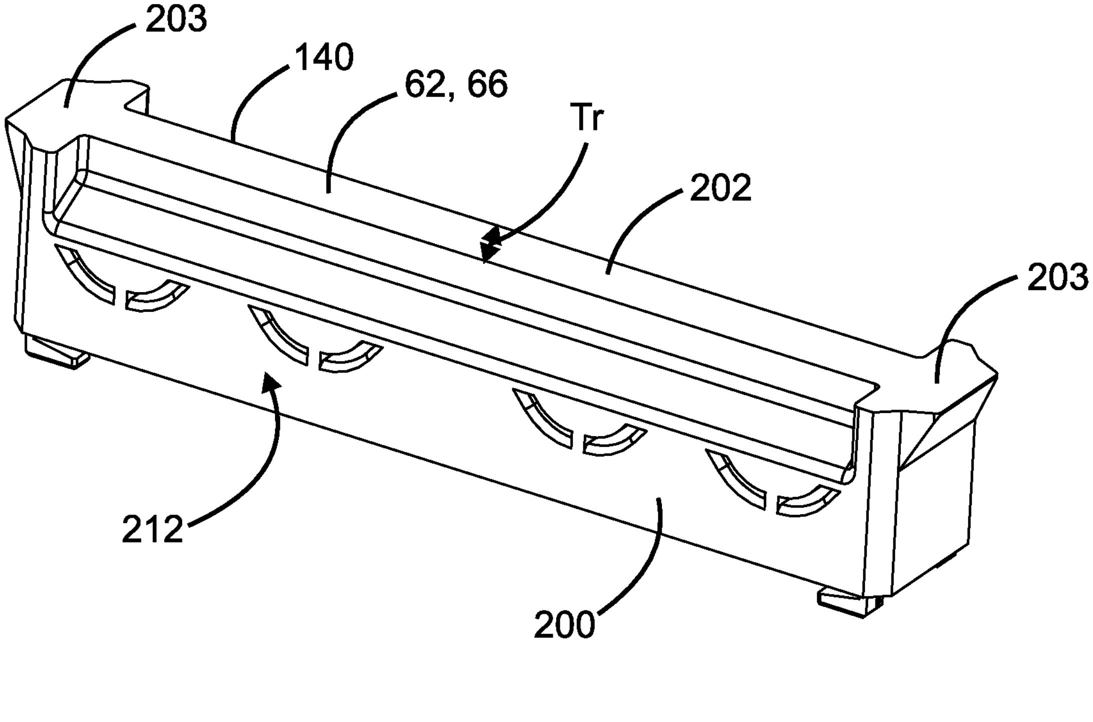
FIG. 15 is another perspective view of the gel section of FIG. 15.
Figure 16:
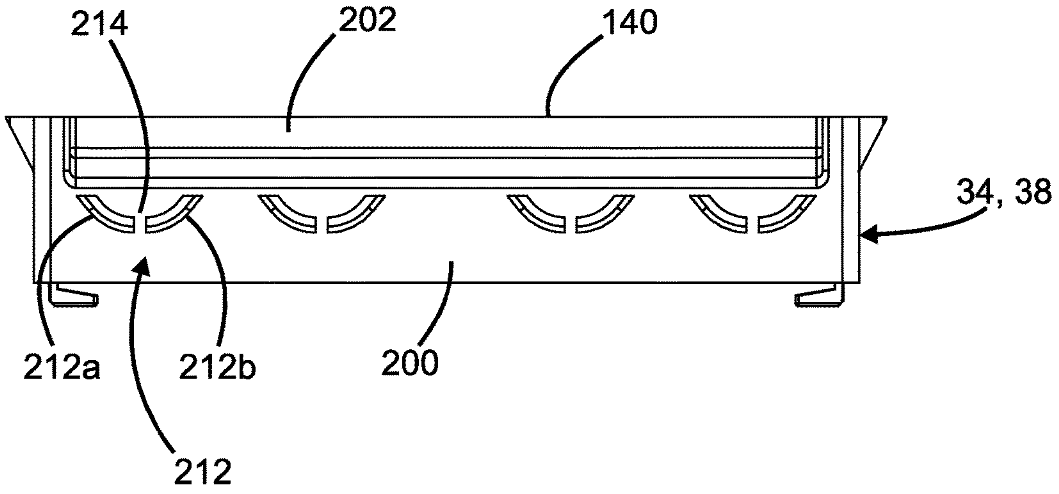
FIG. 16 is an outer view of the gel section of FIGS. 14 and 15.
Figure 17:
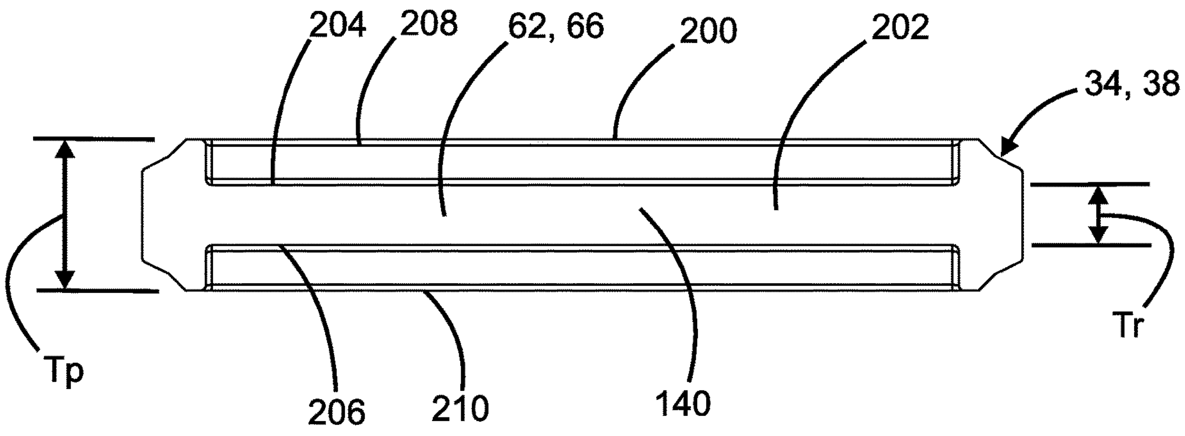
FIG. 17 is a top view of the gel section of FIGS. 14 and 15.

In one example, the volume of sealing gel of the middle gel section 36 defines slits 199 at the recessed inner and outer face surfaces 175, 177 that extend around the containment bodies 152 to facilitate removing the gel containers 150 and the corresponding first and second removal portions 156, 160 of gel from the main body of the volume of sealing gel. Referring to FIG. 12, end ribs 179 are provided at opposite ends 70, 72 of the middle gel section 36 adjacent the second cable pass-through interface 32 for reinforcing end sections 181 of sealing gel intended to remain in place when adjacent ones of the gel containers 150 are removed from the non-removable main volume of sealing gel.

In the depicted embodiment of the cable sealing arrangement 23, the upper and lower gel sections 34, 38 have an identical configuration. Referring to FIGS. 14-18, each of the gel sections 34, 38 includes a primary thickness portion 200 defining a primary thickness $T_p$ and a reduced thickness portion 202 defining a reduced thickness $T_r$. The central sealing rib 140 extends along a length of the gel sections 34, 36. The central sealing rib 140 coincides with the reduced thickness portion 202 and defines the reduced thickness $T_r$. Enlarged flanges 203 are located at opposite ends of the central sealing rib 140 to define an I-beam configuration for providing reinforcement to the central sealing rib 140. Recessed inner and outer face surfaces 204, 206 of the central sealing rib 140 are recessed relative to primary inner and outer face surfaces 208, 210 such that the sealing rib 140 is thinner than the primary thickness portion $T_p$. The primary thickness portion 200 of the gel sections 34, 38 defines curved slot structures 212 that extend only partially through the primary thickness portion 200. The curved slot structures 212 are configured to collapse to enhance gel conformance about cables when cables are sealed at the cable pass-through interfaces 30, 32. The curved slot structures 212 are not intended to allow for the removal of gel from the volume of cable sealing gel. Each curved slot structure 212 is arranged defining a concave curvature that faces toward a corresponding one of the first or second cable pass-through interfaces 30, 32. Each of the curved slot structures 212 also includes first and second curved slot segments 212*a*, 212*b* separated by a slot reinforcing rib 214. The gel sections 34, 36 are reinforced by a frame 216 embedded within the gel of the gel sections 34, 36 within the primary thickness portion 200. The frame 216 includes tabs 218 for securing a leaf spring 220 to the gel sections 34, 36 at a side opposite from sealing rib 140. The frame 216 also includes tabs 40 for latching the gel sections 34, 36 within their corresponding housing pieces 24, 26. The frame 216 includes reinforcing ribs 224 that loop across the thickness of the gel sections 34, 36. The reinforcing ribs include first ribs 224*a* and second ribs 224*b* that are arranged in alternating sets. The second ribs 224*b* are shorter than the first ribs 224*a* and generally align with the curved slot structures 212.

Figure 21:
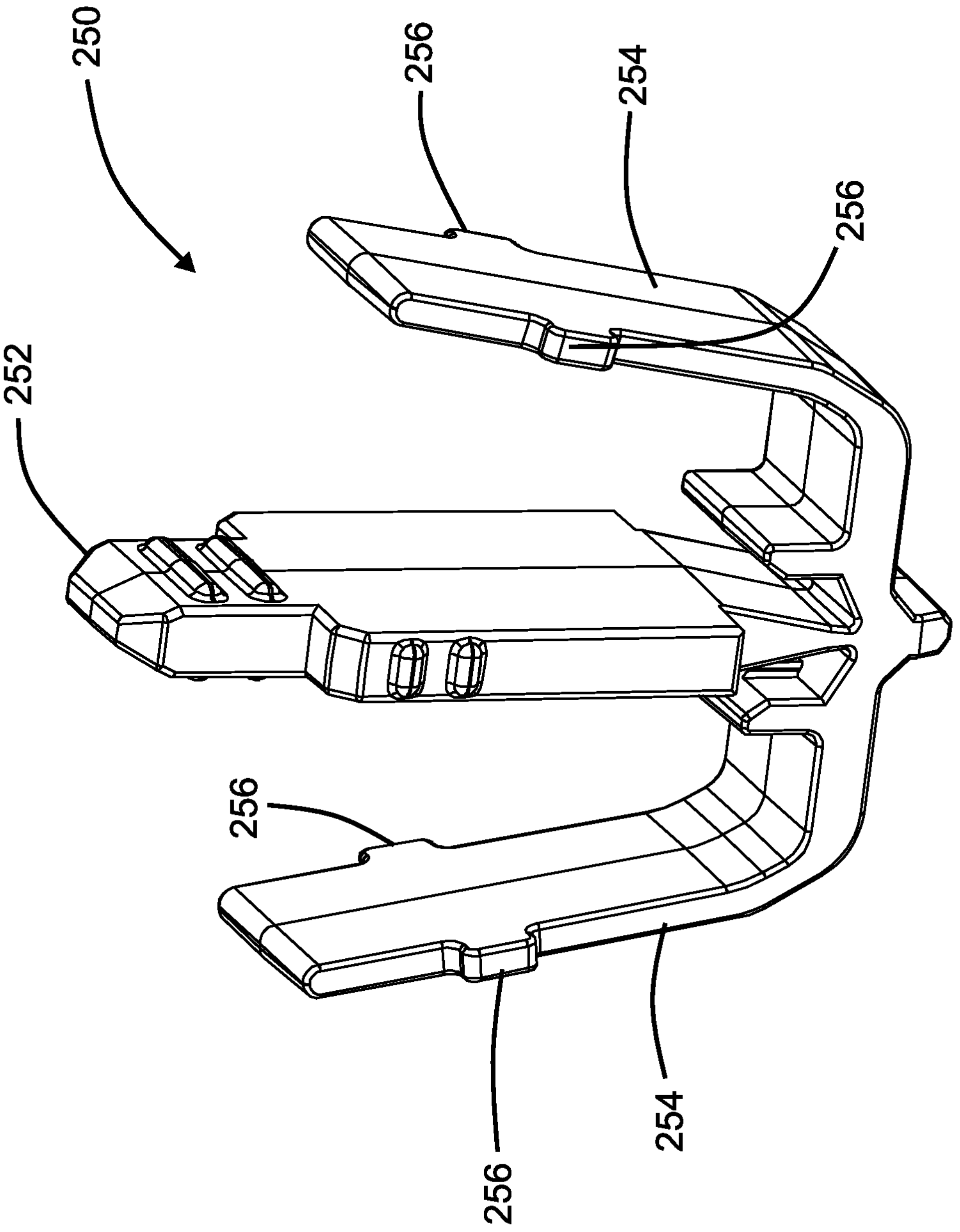
FIG. 21 is a perspective view of a divider that is mountable within the inner and outer gel containment barriers.

Referring to FIGS. 19-21, the cable sealing arrangement 23 also includes dividers 250 that mount at the second cable pass-through locations 48 for facilitating installing smaller cables at the second cable pass-through locations 48. It will be appreciated that the dividers 250 can be removed from the second cable pass-through locations 48 when it is desired to route larger cables through the second cable pass-through locations 48. The dividers can be secured within the inner and outer axial containment barriers 42, 44 by snap fit connections. As depicted, the dividers include a central divider 252 positioned between two latching arms 254. The latching arms 254 are biased toward an outwardly angled orientation and remain in the outwardly angled orientation when at rest. The latching arms 254 are forced inwardly to a generally vertical position when the dividers 250 are installed within the inner and outer containment barriers 42, 44. Tabs 256 on the latches fit within corresponding receptacles 258 defined by the inner and outer containment barriers 42, 44. The receptacles 258 include ramp surfaces 260 that allow the dividers to 50 to be pulled from the second cable pass-through locations 48 without requiring the latching arms 254 to be manually flexed inwardly. Instead, when the dividers 250 are pulled from their corresponding second cable pass-through locations 48, the tabs 256 ride on the ramp surfaces 260 causing the latching arms 254 to flex inwardly. The central divider 252 is configured to pivot toward either of the latching arms 254 to accommodate cables of different sizes.

FIGS. 24-29 defined another enclosure 420 in accordance with the principles of the present disclosure the enclosure 420 includes a cable sealing arrangement 423 having a similar configuration as the cable sealing arrangement 23. However, a middle gel section 436 has been modified to accommodate more drop cables at a first cable pass-through interface 430 and the middle gel section 436 is longer than the middle gel section 36. Additionally, the cable sealing arrangement 423 includes five sets of the male and female coupling elements 80, 82 for securing inner and outer axial containment barriers 442, 444 of the cable sealing arrangement 423 together. Additional flow control ribs 404 have been added to control the flow gel along the height of the middle gel section 436 and the supplemental latches 100, 102 have been eliminated. Additionally, the upper gel section 434 includes two separate gel blocks 434*a*, 434*b* which have a uniform thickness rather than having a central sealing rib. Each of the gel blocks 434*a*, 434*b* includes a reinforcing frame 416 having a narrowed mid region (e.g., a waisted mid-region). The reinforcing frame 416 includes a plurality of looped reinforcing ribs 424, tabs 440 for securing the gel blocks within their corresponding enclosure housing pieces, and tabs 418 for securing a leaf spring 220 to each of the gel blocks.

In certain examples, the cable sealing gel and the containment bodies of the removeable gel containers can each have an elastomeric construction with a base composition that includes silicone (e.g., polysiloxanes or polymethylsiloxanes). In certain examples, the sealing portion and the containment bodies can each include an elastomeric construction with a base composition that includes a thermoplastic elastomeric. Example thermoplastic elastomers can include styrenic block copolymers, thermoplastic polyurethanes, thermoplastic copolyesters, thermoplastic polyamides, thermoplastic polyolefin elastomers, and other thermoplastic elastomers.

In certain implementations, cable sealing gel for use in applications of the type disclosed herein includes a hydrolyzation cured vinyl-terminated polydimethylsiloxane (PDMS) gel or rubber. Additional information on such a material can be found in U.S. Pat. No. 8,642,891, the disclosure of which is hereby incorporated herein by reference in its entirety. In one example, the sealing gel can be made by reacting a cross-linker, a chain extender and a vinyl-terminated polydimethylsiloxane (PDMS). In other implementations, sealing gel for use in applications of the type disclosed herein include peroxide or heat cured vinyl-terminated PDMS material. In other implementations, sealing gel for use in applications of the type disclosed herein includes moisture (and/or ultraviolet light UV) cured PDMS material (various terminations possible, including silanol). In other implementations, sealing gel for use in applications of the type disclosed herein includes moisture (and/or UV) cured, silylated polyether (commonly silyl modified "MS polymer") material. In certain implementations, the sealing gel includes polyether or polyester based polyurethane. In other implementations, sealing gel for use in applications of the type disclosed herein includes chemically crosslinked polyacrylate (acrylic or methacrylic) e.g. n-butyl acrylate or ethyl-hexyl acrylate with triethylene glycol dimethacrylate. In other implementations, sealing gel for use in applications of the type disclosed herein includes ionically crosslinked rubber. In other implementations, sealing gel for use in applications of the type disclosed herein includes chemically crosslinked styrene-butadiene-styrene (SBS) family thermoplastic elastomer (TPE) gel (crosslinks in polystyrene phase only) or SBS family TPE rubber. In other implementations, sealing gel for use in applications of the type disclosed herein includes physically crosslinked triblock polyacrylate material (e.g. Kurarity®). In other implementations, sealing gel for use in applications of the type disclosed herein includes physically crosslinked triblock olefin material (e.g. Infuse). In other implementations, sealing gel for use in applications of the type disclosed herein includes hybrids and/or multiple combinations of above chemistries.

In other examples, the sealing gel can include an extended (e.g., oil extended) co-polymer gel such as a gel having a composition that includes di-block and/or tri-block co-polymers (e.g., hard-elastomer-hard block co-polymers such as styrene-(ethylene/propylene)-styrene (SEPS) and/or styrene-(ethylene/butylene)-styrene (SEBS) block co-polymers). Example sealants having extended co-polymer gels are disclosed in U.S. Pat. Nos. 5,618,882; 5,442,004; 5,541,250; 5,994,446; and PCT International Patent Publication Nos. WO88/00603; WO94/182273; and WO93/23472, all of which are hereby incorporated by reference in their entireties.

Example sealing gels can include cross-linked rubber gels. Example sealing gels can include styrenic block copolymers (e.g., di-block and tni-block copolymers) such as cross-linked styrene-butadiene-styrene (SBS) family thermo-plastic elastomer (TPE) gels. Example sealing gels can include including extended (e.g., oil extended) co-polymer gels such as gels having a composition that includes di-block and/or tri-block co-polymers (e.g., hard-elastomer-hard block co-polymers such as styrene-(ethylene/propylene)-styrene (SEPS) and/or styrene-(ethylene/butylene)-styrene (SEBS) block co-polymers). Example sealing gels can include gels (e.g., silicone gels and other gels) of the type disclosed at U.S. Provisional Patent Application Ser. No. 63/013,992 which is hereby incorporated by reference in its entirety.

Aspects of the present disclosure can be used in other types of cable sealing arrangements. For example, various interfaces and features facilitating gel flow disclosed herein can be utilized in sealing arrangement including only two gel sections as compared to the embodiments depicted herein having three gel sections. Additionally, while the sealing arrangement has been depicted including upper and lower cable pass-through interfaces, will be appreciated that the positioning could also be reversed. The upper, middle and lower gel sections can be referred to as first second and third gel sections in any order.

We claim:

1. A sealing arrangement for a cable entrance to an enclosure, the sealing arrangement comprising:

a volume of sealing gel having a length, a thickness and a height, the volume of sealing gel including a first gel section, a second gel section and a third gel section which cooperate to define the height, the second gel section being positioned between the first and third gel sections, the volume of sealing gel defining a first cable pass-through interface between the first gel section and the second gel section and a second cable pass-through interface between the third gel section and the second gel section, wherein cables can be routed along an axial orientation through the thickness of the volume of sealing gel at the first and second cable pass-through interfaces;

inner and outer axial containment barriers between which the volume of sealing gel is positioned, the inner and outer containment barriers being separated by the thickness of the volume of sealing, the inner and outer axial containment barriers defining first cable pass-through locations spaced along the length of the volume of sealing gel at the first cable pass-through interface, the inner and outer axial containment barriers defining second cable pass-through locations spaced along the length of the volume of sealing gel at the second cable pass-through interface, the second cable pass-through locations being configured to accommodate larger cables than the first cable pass-through locations;

the second gel section including a central sealing rib at the first cable pass-through interface that extends along the length of the volume of sealing gel, the first cable pass-through locations being defined by sets of inner and outer tapered cable receptacles having closed minor ends defined respectively at inner and outer sides of the central sealing rib and open major ends spaced axially from the central sealing rib, the inner and outer tapered cable receptacles having open sides that face toward the first gel section, and wherein the central sealing rib has an axial rib thickness that is less than a primary axial thickness of the volume of sealing gel; and the second gel section including removable gel containers at the second cable pass-through interface that can be removed to reduce the volume of the volume of sealing gel at the second cable pass-through interface to accommodate larger cables at the second cable pass-through locations, wherein the gel containers can remain in the second gel section to accommodate smaller cables at the second cable pass-through locations, wherein the removeable gel containers are over-molded within the second gel section, wherein the containment bodies define cavities which contain first removeable portions of the sealing gel, wherein the first removeable portions of the sealing gel extend to open sides of the containment bodies, and wherein second removeable portions of the sealing gel extend beyond the open sides of the containment bodies from the open sides to the second cable pass-through interface when the gel containers are not removed from the second gel section.

2. The sealing arrangement of claim 1, wherein the inner and outer tapered cable receptacles have truncated conical shapes.

3. The sealing arrangement of claim 1, wherein the volume of sealing gel includes recessed regions at inner and outer faces of the second gel section adjacent the first and second cable sealing interfaces.

4. The sealing arrangement of claim 1, wherein the containment bodies have a different color than the volume of sealing gel.

5. The sealing arrangement of claim 1, wherein the containment bodies also define through-holes opposite the open sides which provide gel communication between the first removable portions of the sealing gel and a non-removable portion of the sealing gel.

6. The sealing arrangement of claim 1, wherein the volume of sealing gel defines slits at inner and outer faces of the volume of sealing gel that extend around the containment bodies to facilitate removing the removeable gel container from the volume of sealing gel.

7. The sealing arrangement of claim 1, wherein the second gel section includes first and second ends separated by a length of the second gel section, and wherein the first and second ends include reinforcing ribs for reinforcing non-removeable portions of the cable sealing located adjacent the first and second ends.

8. The sealing arrangement of claim 1, wherein the third gel section includes a primary thickness portion and a reduced thickness portion, wherein a sealing rib that extends along a length of the third gel section defines the reduced thickness portion, wherein inner and outer faces of the sealing rib are recessed relative to inner and outer faces of the primary thickness portion such that the sealing rib is thinner than the primary thickness portion, wherein the sealing rib is positioned at the second cable sealing interface, wherein the third gel section defines curved slot structures that extend only partially through the primary thickness portion, wherein the curved slot structures being configured to collapse to enhance gel conformance about cables when the cables are sealed at the second cable pass-through interface, wherein each curved slot structure is arranged defining a concave curvature that faces toward the second cable pass-through interface, and wherein each curved slot structure includes first and second curved slot segments separated by a slot reinforcing rib.

9. The sealing arrangement of claim 1, wherein the first gel section does not include sets of inner and outer tapered cable receptacles at the first cable pass-through interface which correspond to the sets of inner and outer tapered cable receptacles defined by the second gel section at the first cable pass-through interface.

10. A sealing arrangement for a cable entrance to an enclosure, the sealing arrangement comprising:

a volume of sealing gel having a length, a thickness and a height, the volume of sealing gel including a first gel section and a second gel section which cooperate to define the height and which each extend along the length and the thickness, the volume of sealing gel defining a cable pass-through interface between the first gel section and the second gel section, wherein cables can be routed along an axial orientation through the thickness of the volume of sealing gel at the cable pass-through interface; and the second gel section including a central sealing rib at the first cable pass-through interface that extends along the length of the volume of sealing gel, second gel section including sets of inner and outer tapered cable receptacles having closed minor ends defined respectively at inner and outer sides of the central sealing rib and open major ends spaced axially from the central sealing rib, the sets of inner and outer tapered cable receptacles defining cable pass-through locations spaced apart along the central sealing rib, the inner and outer tapered cable receptacles having open sides that face toward the first gel section, and wherein the central sealing rib has a rib axial thickness that is less than a primary axial thickness of the volume of sealing gel.

11. The sealing arrangement of claim 10, wherein the inner and outer tapered cable receptacles have truncated conical shapes.

12. The sealing arrangement of claim 10, wherein the second gel section includes recessed inner and outer face surfaces encompassing the major ends of the inner and outer tapered cable receptacles, wherein second gel section defines a recessed thickness at the recessed inner and outer recessed face surfaces that is greater than the rib axial thickness and less than the primary thickness.

13. The sealing arrangement of claim 10, wherein the first gel section does not include sets of inner and outer tapered cable receptacles at the cable pass-through interface which correspond to the sets of inner and outer tapered cable receptacles defined by the second gel section at the cable pass-through interface.

14. A sealing arrangement for a cable entrance to an enclosure, the sealing arrangement comprising:

a volume of sealing gel having a length, a thickness and a height, the volume of sealing gel including a first gel section and a second gel section which cooperate to define the height and which each extend along the length and the thickness, the volume of sealing gel defining a cable pass-through interface between the first gel section and the second gel section, wherein cables can be routed along an axial orientation through the thickness of the volume of sealing gel at the cable pass-through interface; and the second gel section including removable gel containers at the cable pass-through interface that can be removed to reduce the volume of the volume of sealing gel at the cable pass-through interface to accommodate larger cables at the cable pass-through interface, wherein the gel containers can remain in the second gel section to accommodate smaller cables at the cable pass-through locations, wherein the removeable gel containers are overmolded within the second gel section, wherein the containment bodies define cavities which contain first removeable portions of the sealing gel, wherein the first removeable portions of the sealing gel extend to open sides of the containment bodies, and wherein second removeable portions of the sealing gel extend beyond the open sides of the containment bodies from the open sides to the cable pass-through interface when the gel containers are not removed from the second gel section.

15. The sealing arrangement of claim 14, wherein the containment bodies have a different color than the volume of sealing gel.

16. The sealing arrangement of claim 14, wherein the containment bodies also define through-holes opposite the open sides which provide gel communication between the first removable portions of the sealing gel and a non-removable portion of the sealing gel.

17. The sealing arrangement of claim 14, wherein the volume of sealing gel defines slits at inner and outer face surfaces of the volume of sealing gel that extend around the containment bodies to facilitate removing the removeable gel container from the volume of sealing gel.

18. The sealing arrangement of claim 14, wherein the second gel section includes first and second ends separated by a length of the second gel section, and wherein the first and second ends include reinforcing ribs for reinforcing non-removeable portions of the cable sealing located adjacent the first and second ends.

19. A sealing arrangement for a cable entrance to an enclosure, the sealing arrangement comprising:

a volume of sealing gel having a length, a thickness and a height, the volume of sealing including a first gel section and a second gel section which cooperate to define the height and which each extend along the length and the thickness, the volume of sealing gel defining a cable pass-through interface between the first gel section and the second gel section, wherein cables can be routed along an axial orientation through the thickness of the volume of sealing gel at the cable pass-through interface; and the second gel section including a primary thickness portion and a reduced thickness portion, wherein a sealing rib that extends along a length of the second gel section defines the reduced thickness portion, wherein inner and outer face surfaces of the sealing rib are recessed relative to inner and outer face surfaces of the primary thickness portion such that the sealing rib is thinner than the primary thickness portion, wherein the sealing rib is positioned at the cable sealing interface, wherein the primary thickness portion defines curved slot structures that extend only partially through the primary thickness portion, wherein the curved slot structures are configured to collapse to enhance gel conformance about cables when the cables are sealed at the cable pass-through interface, wherein each curved slot structure is arranged defining a concave curvature that faces toward the cable pass-through interface, and wherein each curved slot structure includes first and second curved slot segments separated by a slot reinforcing rib.

* * * * *